(12) United States Patent
Nagasaka et al.

(10) Patent No.: US 7,070,339 B2
(45) Date of Patent: Jul. 4, 2006

(54) METHOD OF MANUFACTURING OPTICAL TRANSCEIVER AND ADJUSTMENT DEVICE THEREOF

(75) Inventors: Kimio Nagasaka, Nirasaki (JP); Akira Miyamae, Fuji-machi (JP); Takeo Kaneko, Misato-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/601,583

(22) Filed: Jun. 24, 2003

(65) Prior Publication Data

US 2004/0028349 A1 Feb. 12, 2004

(30) Foreign Application Priority Data

Jul. 1, 2002 (JP) .............................. 2002-192634
Feb. 6, 2003 (JP) .............................. 2003-029990

(51) Int. Cl.
G02B 6/38 (2006.01)
(52) U.S. Cl. .............................. 385/88; 385/53; 385/90; 385/91; 385/92
(58) Field of Classification Search .................. 385/88, 385/89, 90, 91, 92, 53
See application file for complete search history.

(56) References Cited

U.S. PATENT DOCUMENTS

| | | | |
|---|---|---|---|
| 5,278,929 A | 1/1994 | Tanisawa et al. | |
| 5,295,212 A * | 3/1994 | Morton et al. ................ | 385/57 |
| 5,526,455 A | 6/1996 | Akita et al. | |
| 5,532,856 A | 7/1996 | Li et al. | |
| 5,548,677 A | 8/1996 | Kakii et al. | |
| 5,719,978 A | 2/1998 | Kakii et al. | |
| 5,757,503 A | 5/1998 | Brady et al. | |
| 5,764,833 A | 6/1998 | Kakii et al. | |
| 5,787,215 A | 7/1998 | Kuhara et al. | |
| 5,790,310 A | 8/1998 | Huang | |
| 5,875,167 A | 2/1999 | Katayama | |
| 5,877,853 A | 3/1999 | Honmou | |
| 5,963,696 A | 10/1999 | Yoshida et al. | |
| 6,040,934 A | 3/2000 | Ogusu et al. | |
| 6,069,987 A | 5/2000 | Sasaki et al. | |
| 6,211,957 B1 | 4/2001 | Erdogan et al. | |
| 6,236,669 B1 | 5/2001 | Nakanishi et al. | |
| 6,374,021 B1 | 4/2002 | Nakanishi et al. | |

FOREIGN PATENT DOCUMENTS

| | | |
|---|---|---|
| JP | A-60-153184 | 8/1985 |
| JP | A-60-233601 | 11/1985 |
| JP | A-62-215910 | 9/1987 |
| JP | A-04-003005 | 1/1992 |
| JP | A-04-053912 | 2/1992 |

(Continued)

*Primary Examiner*—Jennifer Doan
(74) *Attorney, Agent, or Firm*—Oliff & Berridge, PLC

(57) ABSTRACT

The invention provides a manufacturing method of an optical transceiver whereby the manufacturing process can be further simplified. A method to manufacture an optical transceiver includes: combining an optical socket and an assembling object to be assembled with the optical socket, where the optical socket includes a fitting hole to mount an optical plug holding an end portion of an optical fiber; mounting an optical head to photograph the assembling object in the fitting hole of the optical socket, and obtaining an image of the assembling object exposed to the fitting hole and reference position information in the photographed image display screen; a detecting a difference between the image of the assembling object and the reference position information; reducing the difference by moving the optical socket and the assembling object relative to each other based on the difference; and fixing the assembling object and the optical socket.

10 Claims, 21 Drawing Sheets

FOREIGN PATENT DOCUMENTS

| | | |
|---|---|---|
| JP | A-04-241477 | 8/1992 |
| JP | A-10-010373 | 1/1998 |
| JP | A-11-509687 | 8/1999 |
| JP | A-2001-036100 | 2/2001 |
| JP | A-2001-174672 | 6/2001 |
| JP | A-2002-033546 | 1/2002 |
| JP | A-2003-503858 | 1/2003 |
| WO | WO97/04491 A1 | 2/1997 |
| WO | WO 01-01497 A1 | 1/2001 |

* cited by examiner

FIG. 1
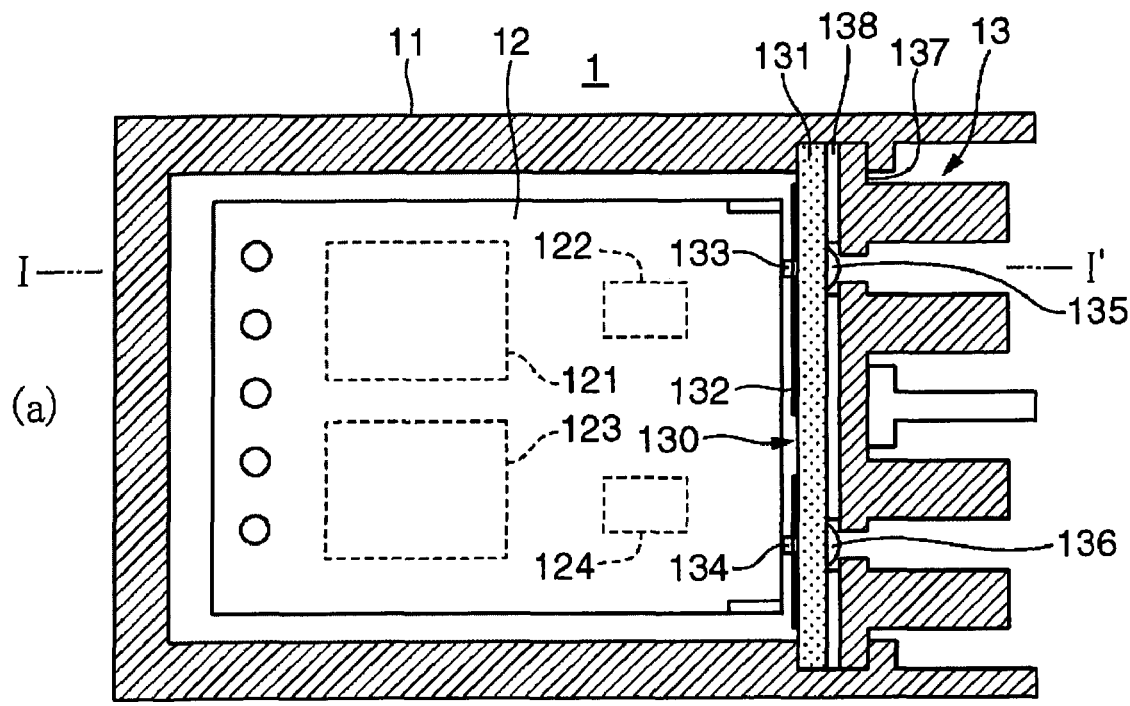
(a)
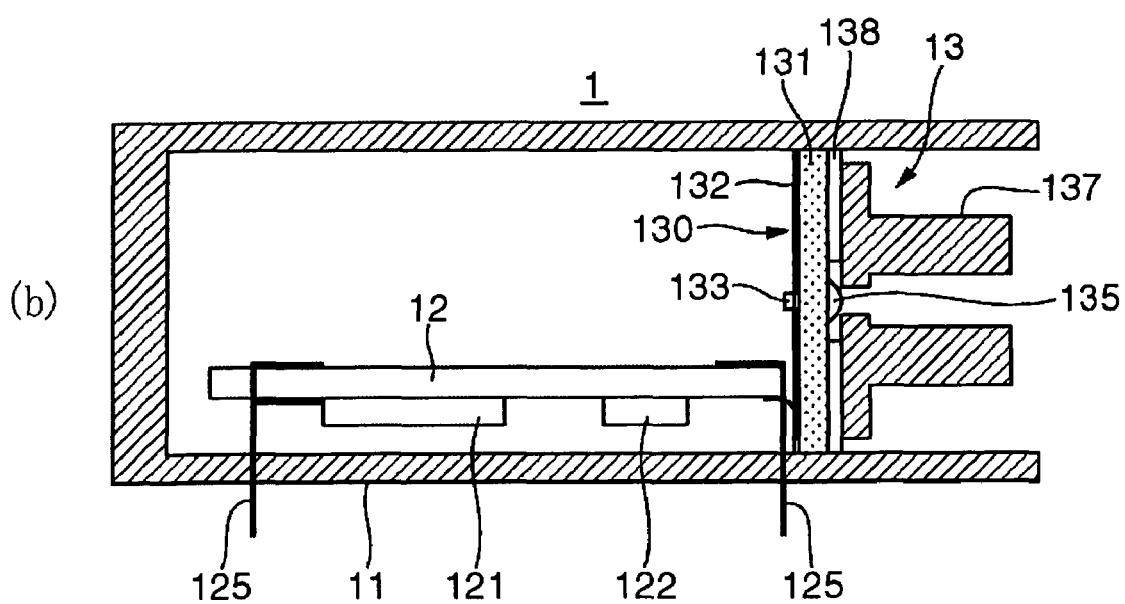
(b)
I-I' CROSS SECTION (a)  (b)

FIG. 5
(a) 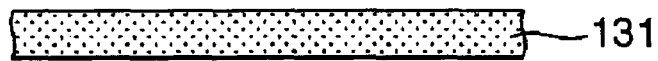
(b) 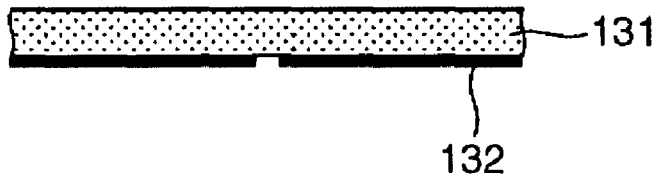
(c) 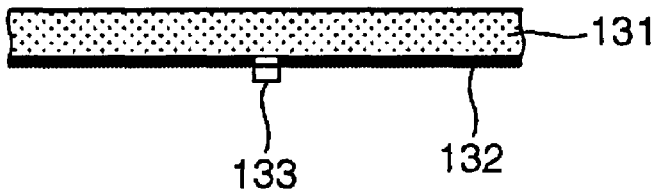
(d) 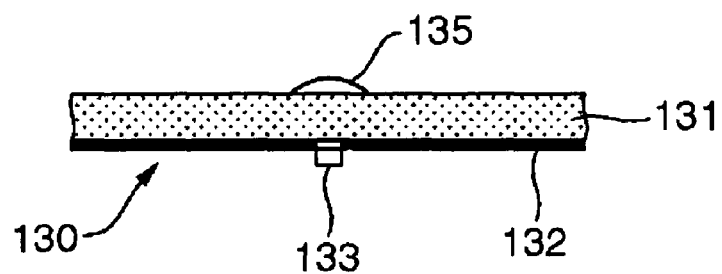
(e) 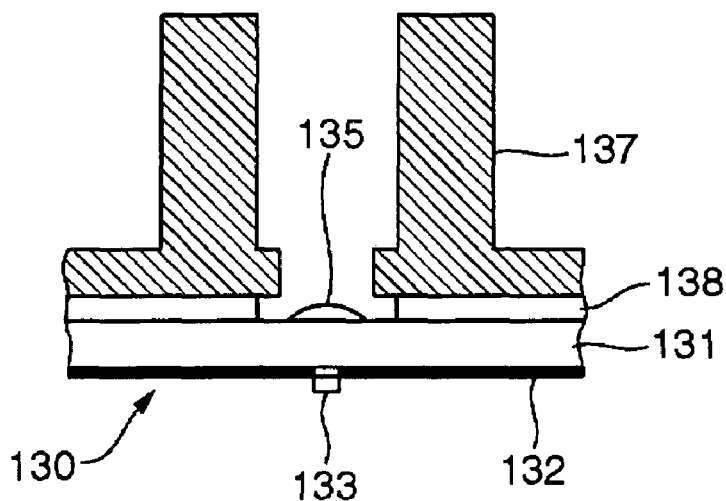

FIG. 14
(a)
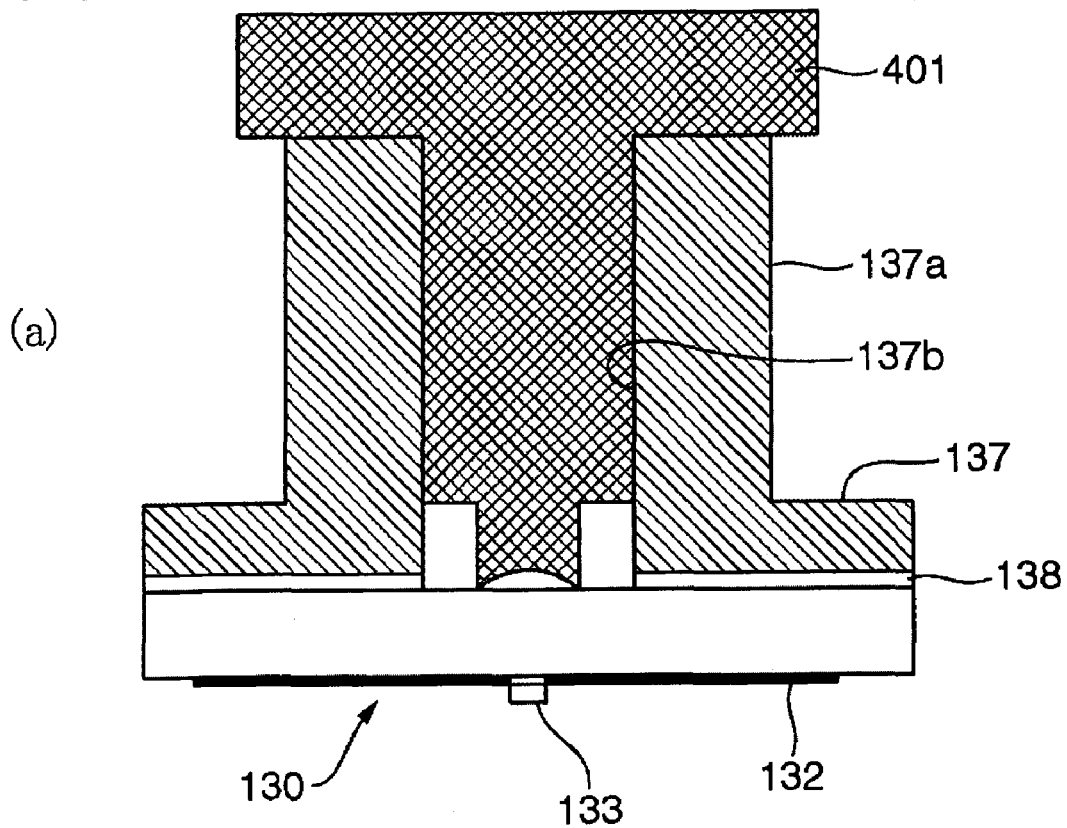
(b)
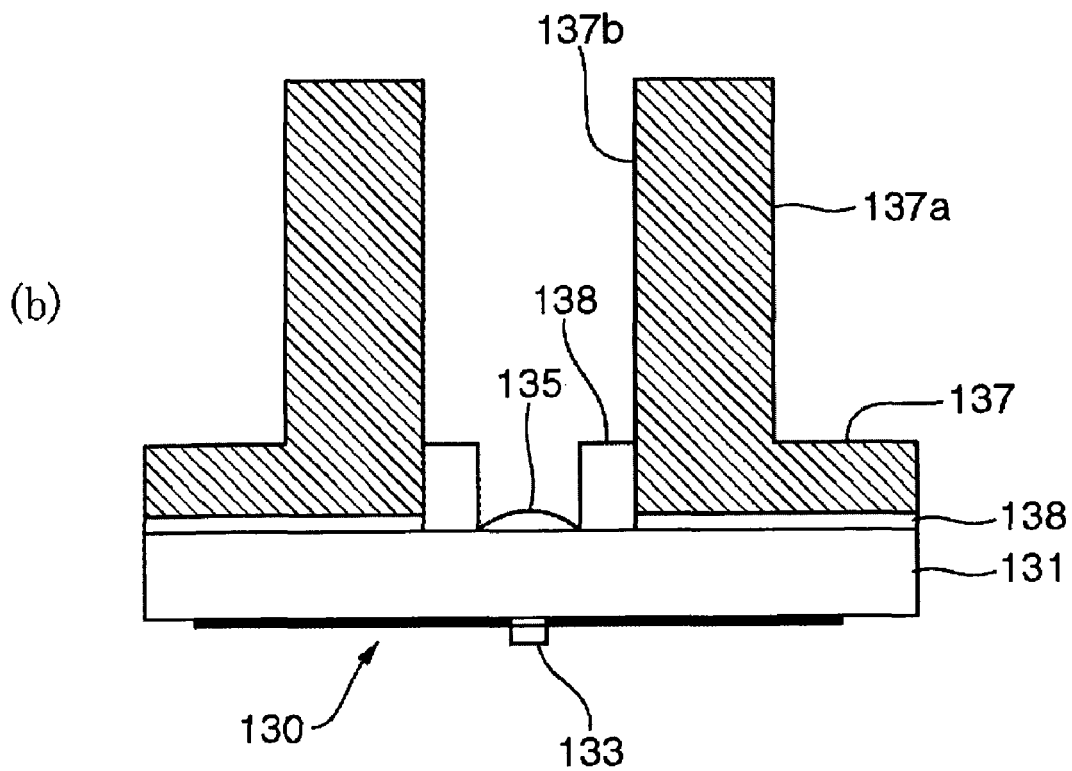

FIG. 23
(a) 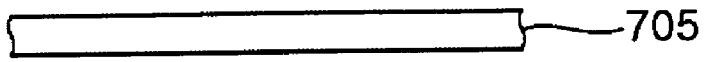
(b) 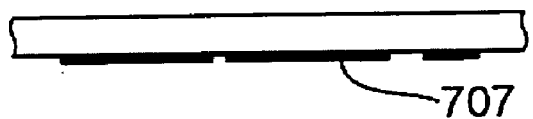
(c) 
(d) 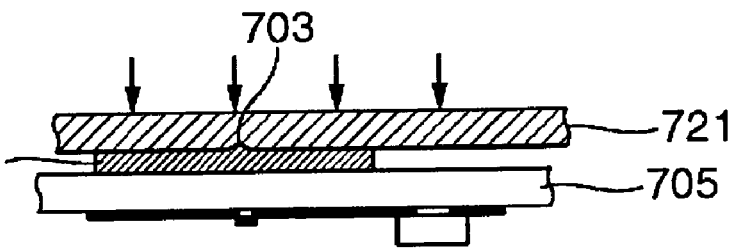
(e) 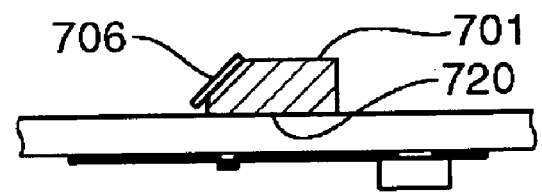
(f) 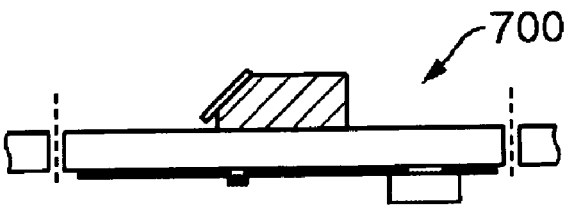

F I G. 2 7
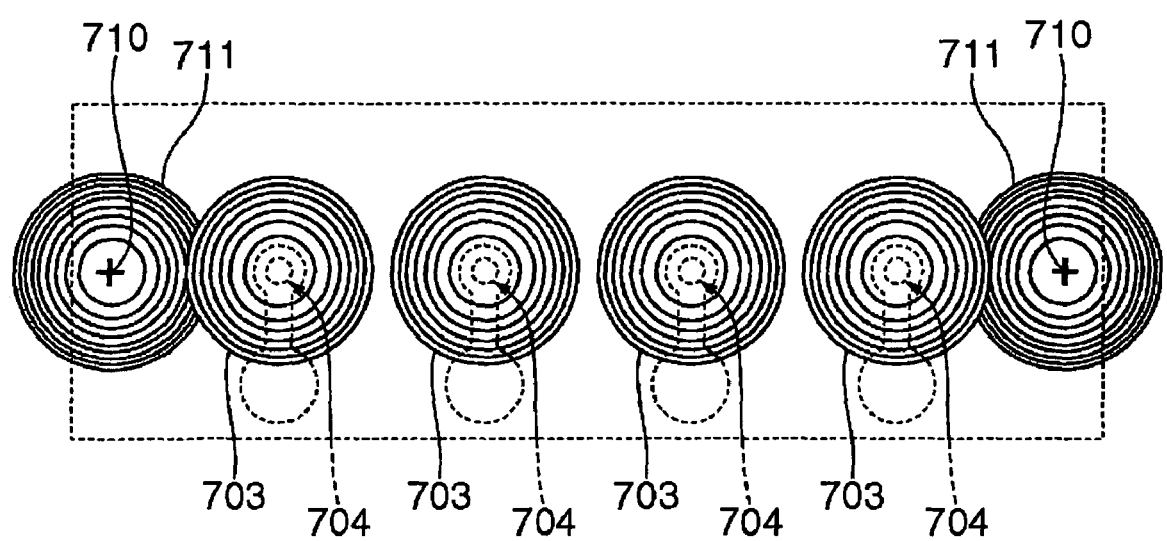

METHOD OF MANUFACTURING OPTICAL TRANSCEIVER AND ADJUSTMENT DEVICE THEREOF

BACKGROUND OF THE INVENTION

1. Field of Invention

The present invention relates to an optical transceiver to transmit and/or receive through an optical fiber as a medium, and a method of manufacturing the same.

2. Description of Related Art

The related art includes devices that use optical fibers for direct connection between Local Area Networks (LANs) and computer devices, and for mutual connection between computer devices and digital audio/video apparatuses, etc. Such devices employ an optical transceiver that converts an electrical signal to an optical signal and transmits it on an optical fiber, and also converts the optical signal received from the optical fiber back to an electrical signal. The optical transceiver is, for example, composed of a socket into which a plug mounted on the end of an optical fiber is inserted, a ball lens which is disposed between the end of the optical fiber and an optical element such as a light-receiving element or a light-emitting element and which focuses light, and an IC circuit board which converts a parallel signal to a serial signal so as to drive the optical element, amplifies a received optical signal, or converts a serial signal to a parallel signal.

One related art method of manufacturing such an optical transceiver is generally performed in the following manner. A laser diode (LD) chip is mounted in a can package, and the chip and a lead line are bonded. Further, a ball lens is attached to an exit window of the can package, thereby assembling a can package with an attached lens. Such a can package is inserted into an insertion hole on one side of an optical socket, and a fiber-attached ferrule is inserted from the other side. A current flows into the lead line of the can package so that the LD emits light, the amount of light coupled into the fiber is measured, and the can package and the optical socket are bonded and fixed to a position in which the coupling efficiency is maximized (active alignment). The lead line of the can package is soldered to the circuit board.

SUMMARY OF THE INVENTION

However, in such a method of manufacturing an optical transceiver, three-dimensional, complicated position alignment must be performed when assembling constitution parts and the amount of manual work required in the manufacturing process is high. This results in increased product costs.

Accordingly, the present invention provides a method of manufacturing an optical transceiver which can simplify the manufacturing process.

In order to address or achieve the above and/or other circumstances, the present invention provides a method of manufacturing an optical transceiver, including: combining an optical socket and an assembling object to be assembled with the optical socket, the optical socket including a fitting hole to mount an optical plug holding an end portion of an optical fiber; mounting an optical head to photograph the assembling object in the fitting hole of the optical socket and to obtain an image of the assembling object exposed to the fitting hole and reference position information in the photographed image display screen; detecting a difference between the image of the assembling object and the reference position information; reducing the difference by moving the optical socket and the assembling object relative to each other based on the difference; and fixing the assembling object and the optical socket.

According to such a method, an adjustment of a relative position relationship between the optical socket and the assembling object can be performed by image processing, and therefore the position adjustment is simplified, and it is possible to achieve a rapid and low-cost position adjustment.

Preferably, the assembling object includes a light-transmitting substrate or a can package. Thus, it is possible to deal with optical transceivers in various structures.

Preferably, the image of the assembling object includes any one of a wiring pattern, a positioning mark, a positioning hole, a light-emitting element, a light-receiving element, a lens, and a window of a can package which are formed on the assembling object. In case of using the positioning mark or the positioning hole, it is advantageous in that it is possible to randomly set a shape or a position suitable to perform the adjustment. On the other hand, in the case of using the wiring pattern, the light-emitting element, or the like, it is advantageous in that there is no need to newly form a positioning mark, or the like. Thus, troubles in operations, such as designing, etc., are reduced.

Preferably, the reference position information is a marker representing a screen of the photographed image or a predetermined screen position in the image.

Preferably, in the second process, an image-formation position adjustment lens to adjust an image-formation position of an image is disposed between the optical head and the assembling object so as to obtain the image of the assembling object. This makes it possible to form the image of the assembling object more securely.

An optical head according to the present invention includes: a light-transmitting columnar body including an alignment mark formed on one end surface thereof; a housing provided on the other end surface of the columnar body; an image pick-up element, which is provided in the housing, to convert a projected image to an image signal; and a lens, which is provided in the housing, to project the one end surface of the columnar body onto the image pick-up element.

If such an optical head is set in the optical socket, it is possible to simultaneously see the socket's bottom portion (substrate) and the alignment mark, and to perform a position alignment between the optical socket and the substrate.

Preferably, the optical head further includes a half mirror provided between the image pick-up element and the lens; and an illuminating light source to send illumination light to the columnar body via the half mirror. Accordingly, by illuminating the socket's bottom (substrate), it is possible to obtain a bright and high-quality image. Thus, it is possible to enhance the accuracy of image recognition.

Preferably, the optical head further includes a reflection plate including a reflecting surface to reflect incident light, the reflection plate being disposed between the alignment mark and the lens so that an optical axis of the lens is at an acute angle with respect to the reflecting surface. In addition, it is further preferable that the reflection plate is disposed so that the optical axis is at an angle of about 45 degrees to the reflecting surface. This makes it possible to set the optical axis of the lens in a direction different from the longitudinal direction of the columnar body, and the degree of freedom, such as ensuring arrangement space of the housing or the setting of the arrangement position of the housing is increased. This makes it possible to deal with optical transceivers in various structures.

Preferably, the reflection plate is constituted integrally with the columnar body on the other end surface of the columnar body. This makes it possible to achieve simplification in the structure.

Preferably, the columnar body is formed of a hollow cylindrical body. This makes it possible to perform an adjustment of the optical path, etc., by disposing another optical element, etc., in the columnar body, thereby increasing the degree of freedom of device constitution.

Preferably, the columnar body is formed of a bundle of optical fibers. This makes it possible to dispose the housing in a position spaced from the optical socket.

Preferably, the columnar body is formed to have a lens for focusing light in an axial direction of the columnar body therein. Thereby, the amount of light reaching the lens, which forms an image on the image pick-up element, is increased (the numerical aperture NA is increased), and quality of the picked-up image is improved.

An alignment adjustment device according to the present invention includes an optical head, which is inserted into a fitting hole of an optical socket mounted on a supporting body of the optical socket, to photograph an object around a bottom portion of this fitting hole, and output an image of this object as a read signal together with information representing a photographing reference position; an image processing device to process the read signal to detect a difference between the object and the reference position; and a moving device to reduce the difference by moving the supporting body and the optical socket relative to each other according to the difference.

According to such a constitution, it is possible to automatize the position adjustment of the supporting body and the optical socket. In addition, it is advantageous in that there is no need to electrically contact to the assembling object as performing active alignment, and the manufacturing device can be simplified. An optical socket corresponding to the transmission side and an optical socket corresponding to the reception side can both be handled with the common adjustment device, thereby achieving a simplified and low-cost adjustment device.

Preferably, the information representing the reference position is a marker indicating a screen central position of the photographed image, or a predetermined screen position in the photographed image. This marker may also be a signal marker which is outputted as an electrical signal previously included in a read signal when the central part of the image pick-up element is read, as well as a marker as a real image projected onto the image pick-up element.

Preferably, the information representing the reference position is an alignment mark formed on an object-facing surface of an inserting portion in the optical head facing the object inserted into the fitting hole of the optical socket.

Preferably, the object includes any one of a wiring pattern, a positioning mark, a positioning hole, a light-emitting element, a light-receiving element, and a lens which are formed on the supporting body. These feature patterns can be used as marks for comparison in alignment adjustment.

In addition, it is preferable to further include an image-formation position adjustment lens, which is disposed between the optical head and the object, to adjust an image-formation position of an image. It is further preferable that the image-formation position adjustment lens be disposed on a surface of the object.

BRIEF DESCRIPTION OF THE DRAWINGS

FIGS. 1(a) and 1(b) are schematics illustrating an exemplary embodiment of an optical transceiver according to the present invention;

FIGS. 5(a), 5(b), 5(c), 5(d) and 5(e) are schematics illustrating a manufacturing process of an optical transceiver;

FIGS. 14(a) and 14(b) are schematics illustrating an example of forming a lens by putting a mold into a fitting hole of the optical socket;

FIGS. 23(a), 23(b), 23(c), 23(d), 23(e) and 23(f) are schematics illustrating a manufacturing process of the optical transceiver according to the second exemplary embodiment;

FIG. 27 is a schematic illustrating a constitution example of a lens for adjusting an image-formation position of an image of an alignment mark.

DETAILED DESCRIPTION OF PREFERRED EXEMPLARY EMBODIMENTS

Figure 2:
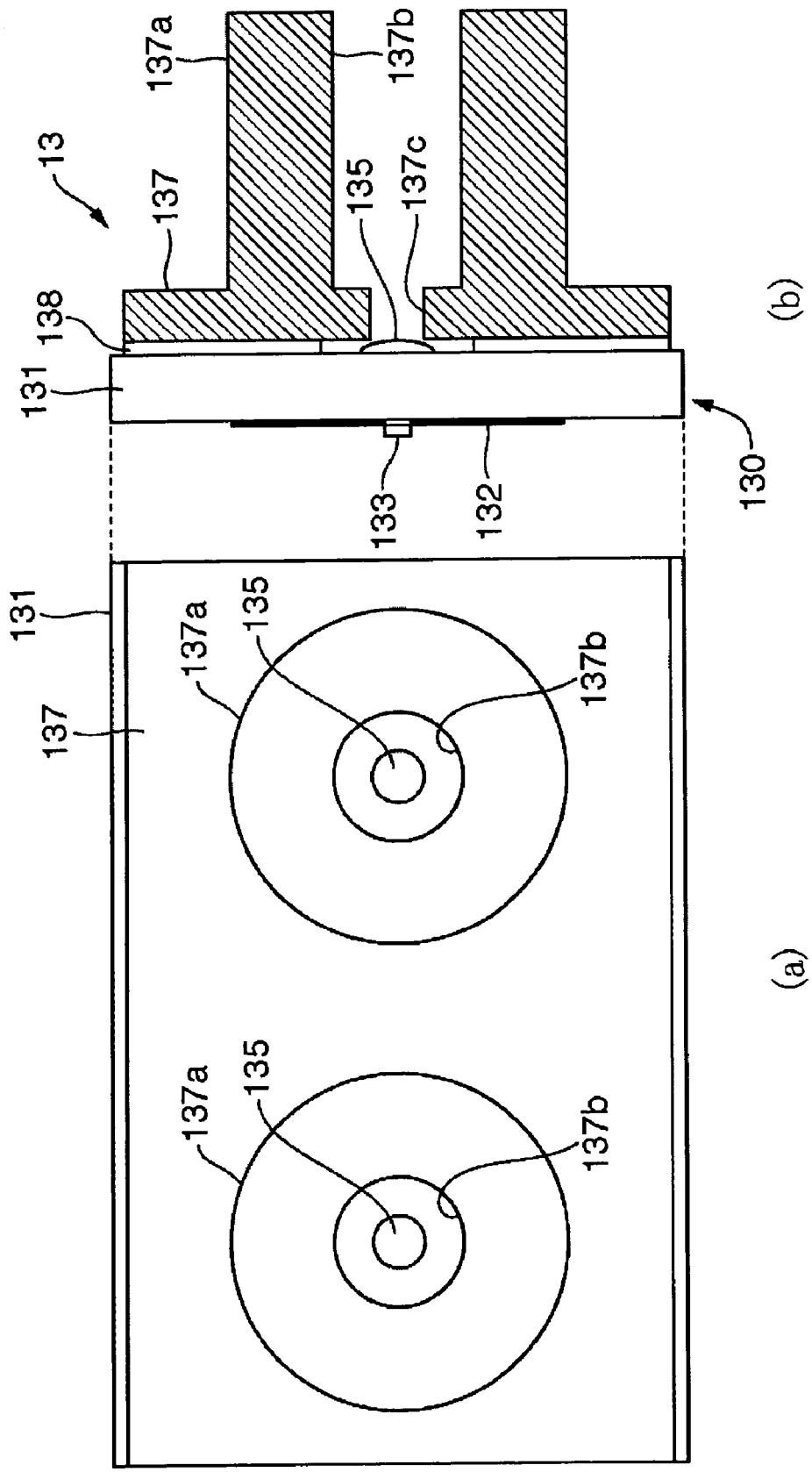
FIGS. 2(a) and 2(b) are schematics illustrating an optical socket part having two sets of terminals.

Exemplary embodiments of the present invention are described below with reference to the drawings.

<First Exemplary Embodiment>

FIGS. 1(a) and 1(b) show a constitution example of an optical transceiver. FIG. 1(a) is a cross-sectional view showing the internal disposition by cutting horizontally the optical transceiver 1, and FIG. 1(b) is a cross-sectional view taken along plane I–I' in FIG. 1(a).

As shown in FIGS. 1(a) and 1(b), a signal processing circuit board 12 and an optical coupling unit 13 are disposed in a housing 11 of the optical transceiver 1. The signal processing circuit board 12 is provided with a parallel-serial signal conversion circuit 121, a drive circuit 122, a serial-parallel signal conversion circuit 123, an amplification circuit 124, a lead frame 125, etc. The parallel-serial signal conversion circuit 121 converts a parallel signal, provided from the outside, into a serial signal. The drive circuit 122 changes the serial signal to a drive signal of a light-emitting element 133. The amplification circuit 124 performs a waveform shaping and a level amplification for received light signal of a light-receiving element 134. The serial-parallel signal conversion circuit 123 converts the received light signal into a parallel signal. The lead frame 125 is used for implementing a wiring connection and an attachment to a motherboard (not shown), etc.

The optical coupling unit 13 is composed of an optical circuit board 130, an optical socket 137, a bonding film 138, etc. In the optical circuit board 130, a wiring film 132, a light-emitting element 133, a light-receiving element 134, coupling lenses 135 and 136, etc., are disposed on a transparent glass substrate 131. The optical socket 137 is connected to an optical plug mounted on an end of an optical fiber (not shown). The bonding film 138 serves as attaching the optical socket 137 to the optical circuit board 130. The optical socket 137 (or the optical coupling unit 13) and the optical plug constitute an optical connector (refer to FIG. 3).

Further, an inserting side is generally referred to as a plug, while a receiving side is referred to as a socket. However, in the description of the present invention, one side (the optical line path) constituting the connector is simply referred to as a plug, and the other side (the substrate side) is referred to as a socket, which is not limited to the shape of female and male.

FIGS. 2(a) and 2(b) are schematics illustrating the portion of the optical coupling unit 13 shown in FIG. 1(a). FIG. 2(a) is a schematic showing the unit optical coupling unit 13 when seen from the side of a plug insertion hole, and FIG. 2(b) is a cross-sectional view of the optical coupling unit 13. In each figure, portions corresponding to those of FIGS. 1(a) and 1(b) are denoted by the same reference numeral, and the explanation of such portions is omitted.

The optical circuit board 130 includes the transparent substrate 131 which transmits an optical signal, the wiring pattern 132 formed on an inner surface (on the housing's inner side) of the transparent substrate 131, the light-emitting element 133 (or the light-receiving element 134) connected to the wiring pattern 132, and the coupling lens 135 disposed on an outer surface (on the optical plug) of the transparent substrate 131. The light-emitting element 133 is, for example, a surface emitting laser (VCSEL) generating a laser beam. The light-receiving element 134 (refer to FIG. 1(a)) is a light-detecting element generating current according to the amount of light received by a photo transistor, a photo diode, or the like. A sleeve 137a of the optical socket 137, into which a ferrule (refer to FIG. 3 described below) holding an optical fiber of the optical plug is inserted, is formed in an annular or cylindrical shape. An opening portion 137c is defined in the center of the bottom of a fitting hole 137b in the sleeve 137a which guides the insertion of the ferrule. The coupling lens 135 (or 136) formed on the substrate 131 is exposed in the opening portion 137c. The fitting hole 137b is formed as a hole perforated through the optical socket 137.

Figure 3:
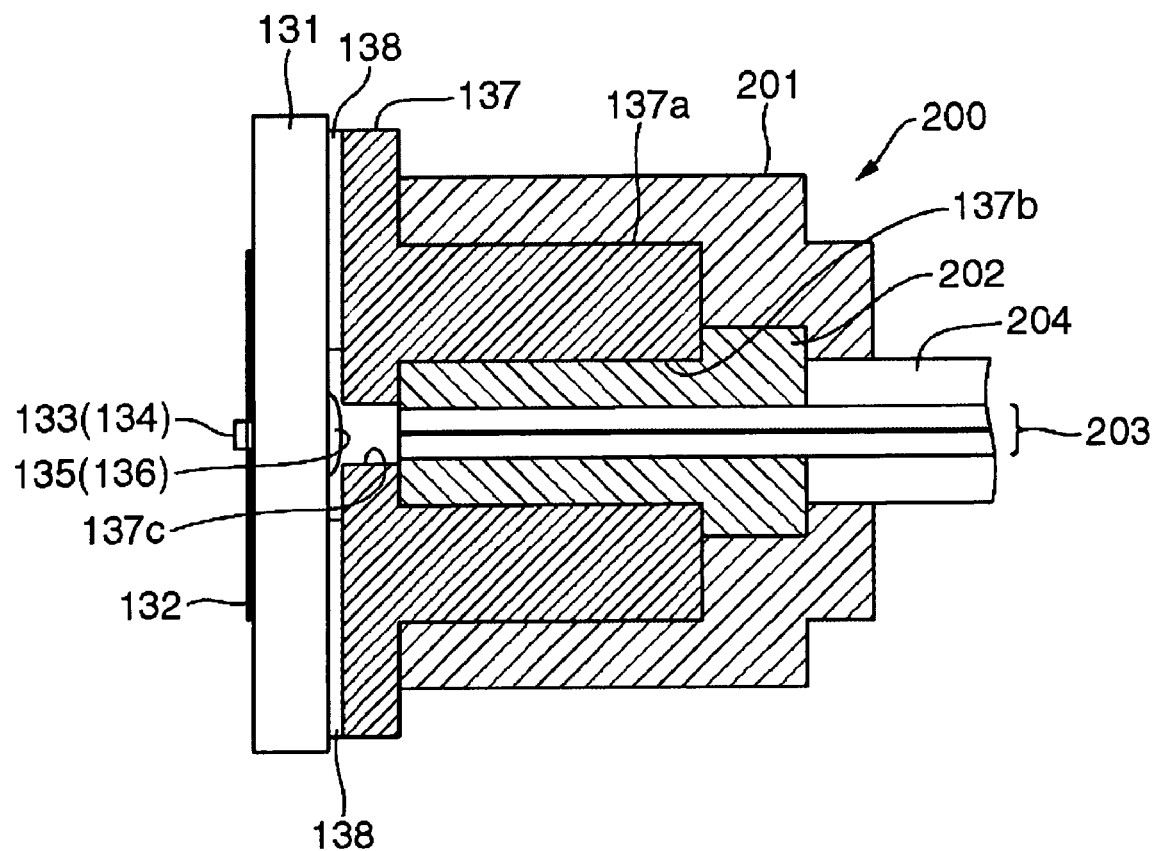
FIG. 3 is a schematic illustrating the connection condition between an optical socket and an optical plug.

FIG. 3 shows a state in which an optical plug 200 is attached to an optical socket 137. A columnar ferrule 202 of an optical plug 200 is inserted into a cylindrical sleeve 137a of the optical socket 137, and the ferrule 202 is protected with a plug housing 201. The optical socket 137 and the optical plug 200 are fastened with latching device (not shown). The latching device is, for example, a stud in which an openable and closable hook mounted on the plug housing 201 and the hook mounted on the optical socket 137 are engaged together. The ferrule 202 holds an end of the optical fiber 203, and is inserted into the cylinder of the sleeve 137a, whereby the central axis (optical axis) of the optical fiber 203 is held on the central axis of the cylinder. The cable part of the optical fiber 203 is protected with a cover 204. Light radiated from the core of the optical fiber 203 passes through the coupling lens 136, disposed in the opening portion 137c of the bottom of the sleeve 137a, and the transparent substrate 131, so as to converge (or focus) onto the light-receiving element 134. In addition, light emitted from the light-emitting element 133 passes through the transparent substrate 131 and the coupling lens 135, so as to converge to the core part of an end of the optical fiber 203.

Figure 4:
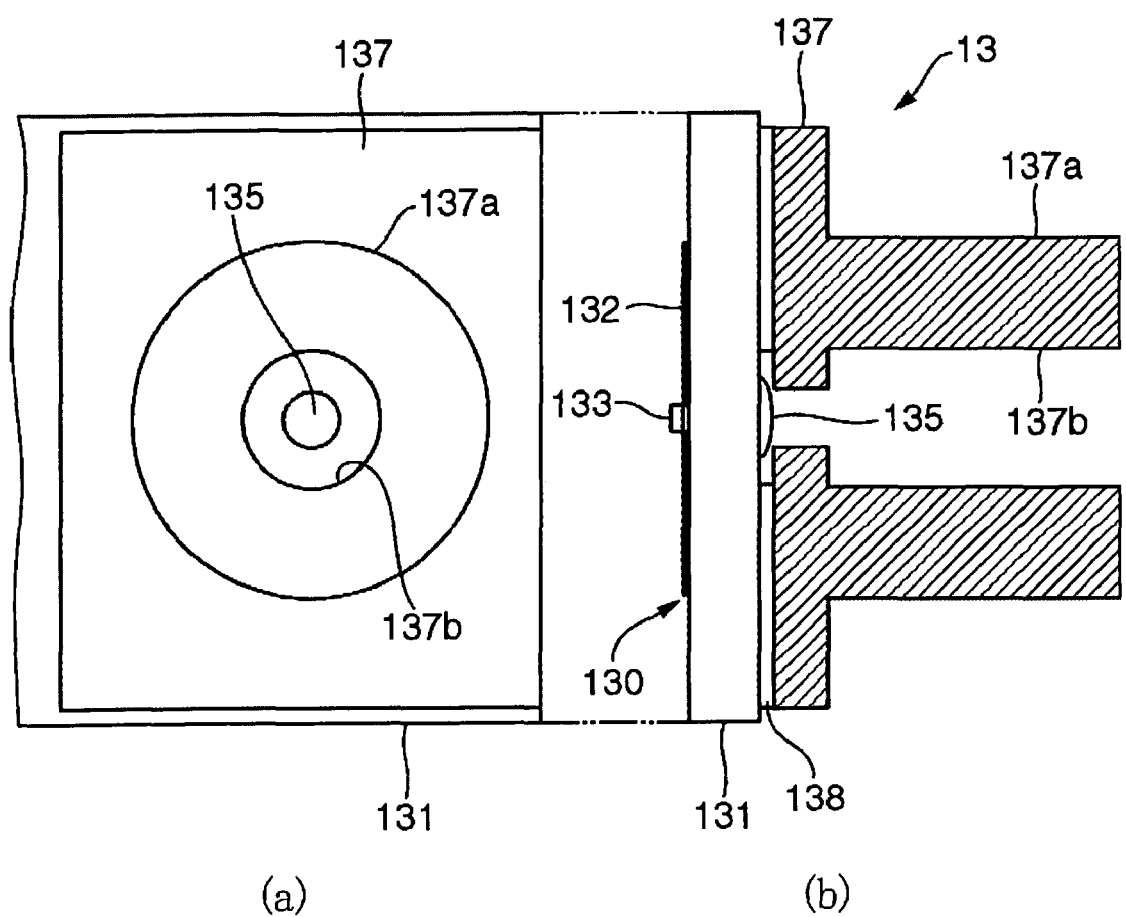
FIG. 4 is a schematic illustrating an optical socket part having a set of terminals.

FIGS. 4(a) and 4(b) show another example of the optical coupling unit (optical connector) 13. In FIGS. 4(a) and 4(b), portions corresponding to those of FIGS. 2(a) and 2(b) are denoted by the same reference numerals, and the explanation of such portions is omitted.

In the above-mentioned example shown in FIGS. 2(a) and 2(b), separate optical fibers are used for the transmission and reception, and one optical connector connects two optical fibers. This example shown in FIGS. 4(a) and 4(b) is configured so that one optical coupling unit (optical connector) is provided for each of optical fibers for transmitting and/or receiving.

Manufacturing the above-mentioned optical transceiver is described below with reference to the drawings. FIGS. 5(a)–5(e) are schematics illustrating the process of manufacturing the optical transceiver of the exemplary embodiment.

First, as shown in FIG. 5(a), a glass substrate 131 as a light-transmitting substrate is prepared in order to manufacture the optical circuit board 130. Subsequently, as shown in FIG. 5(b), a conductive material, such as aluminum or copper, is deposited on the surface of the glass substrate 131 by a sputtering or electroforming method, thereby forming a metal film (a conductive film). This metal film is patterned in correspondence with a desired circuit, so as to form a wiring film 132.

Figure 7:
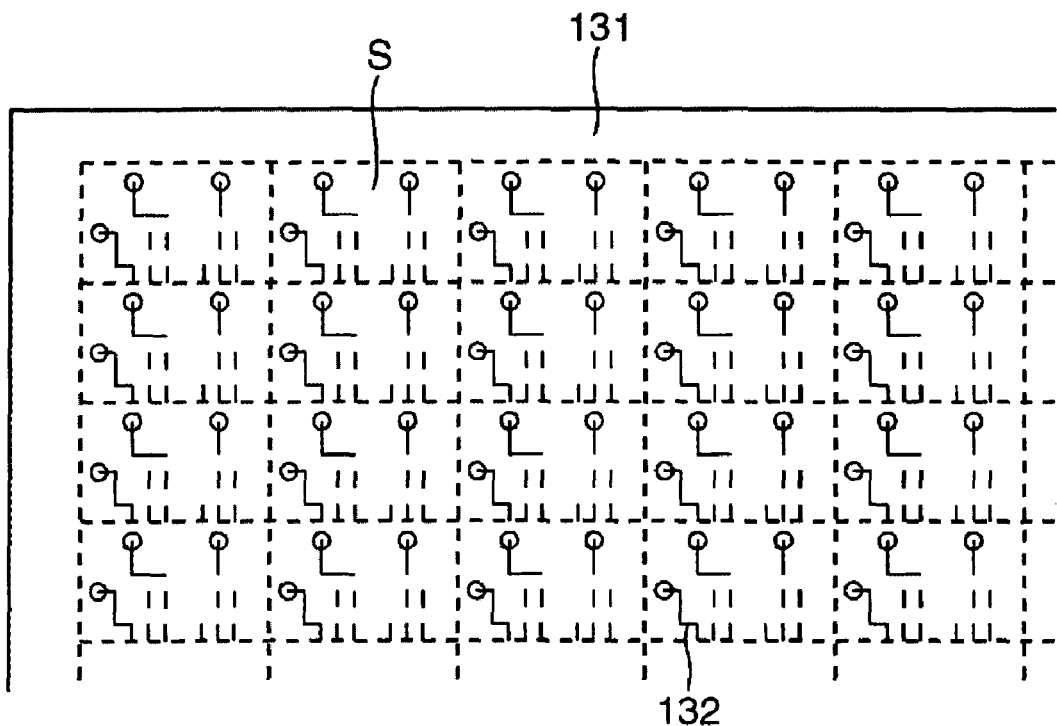
FIG. 7 is a schematic illustrating an example of forming a wiring pattern on a substrate.

FIG. 7 shows an example in which a plurality of metal wiring film patterns 132 are formed in a plurality of sub-regions S of the glass substrate 131, respectively.

As shown in FIG. 5(c), a circuit element, such as an integrated circuit and a light-emitting element 133 (or a light-receiving element 134), is mounted on a surface of the glass substrate 131. The circuit elements can be mounted using flip chip bonding, wire bonding, and solder reflow methods, or the like.

As shown in FIG. 5(*d*), a coupling lens 135 (or 136) is formed in a position corresponding to the light-emitting element 133 (or the light-receiving element 134) of the other surface of the glass substrate 131. The coupling lens 135 (or 136) may be formed through lamination of a lens-shaped member and a lens forming process using a surface tension of a curable liquid resin, and it may also be formed through a lens forming process that combines a 2P method with a mold of a lens, which is described below.

In this manner, the optical circuit board 130 is manufactured.

Subsequently, as shown in FIG. 5(*e*), the optical socket 137 is attached to the optical circuit board 130. The optical socket is attached to the optical circuit board 130 in such a manner that an adhesive is coated on each of a surface of the optical socket 137 and a surface of the glass substrate 131 which face each other, or an adhesive is coated on one of the facing surfaces. The optical socket 137 is disposed so that the central axis of a cylindrical fitting hole 137*b* in its sleeve 137*a* is substantially coincident with the central position of the light-emitting element 133 (or receiving element 134) and the coupling lens 135 (or 136).

In this time, the position alignment (roughly adjustment) of the optical socket 137 and the optical circuit board 130 may be carried out with reference to a marker (not shown), the lens position, or the like, of the board 130.

Figure 6:
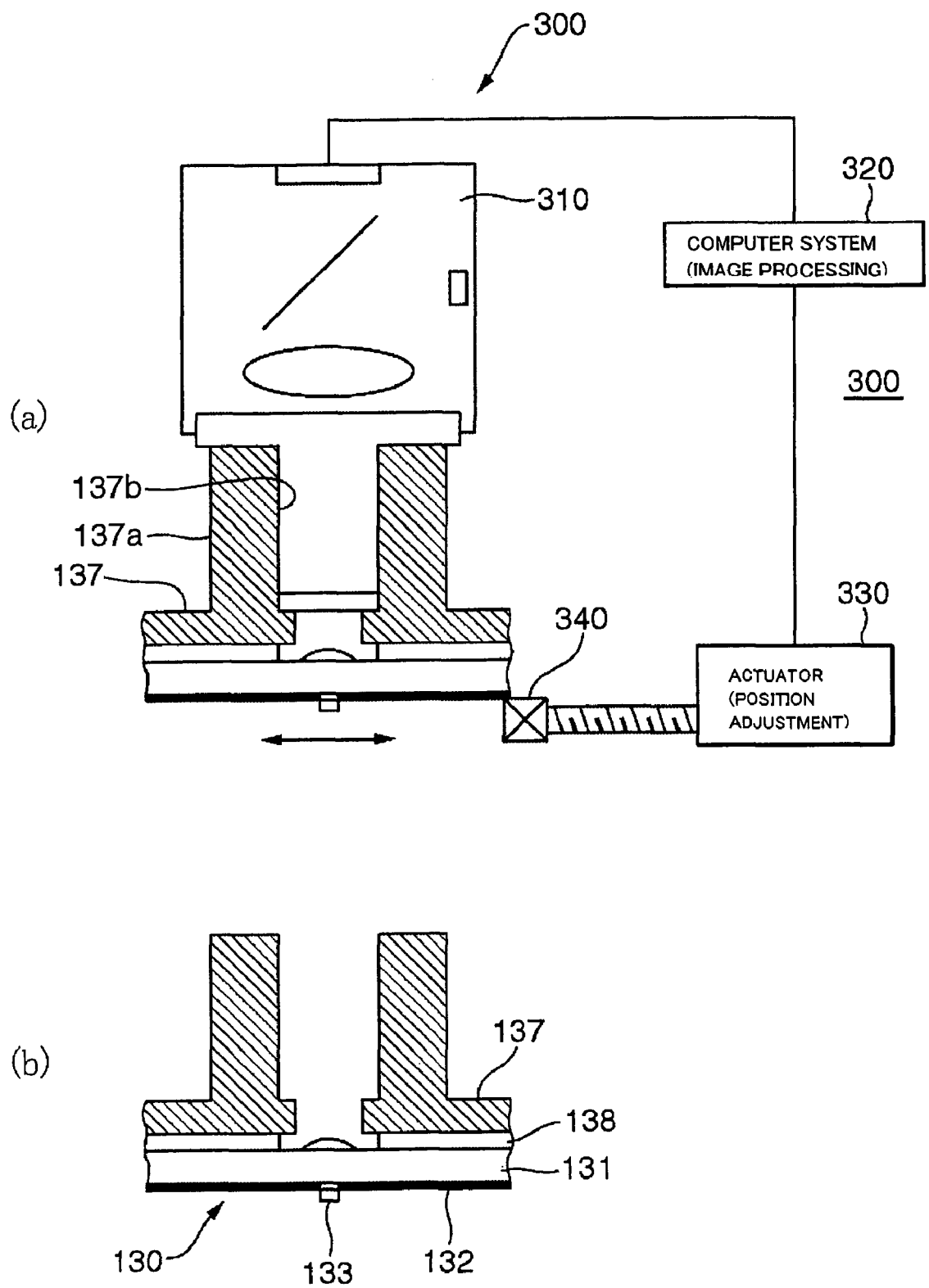
FIGS. 6(a) and 6(b) are schematics illustrating an adjustment of the disposition position of an optical socket in a manufacturing process of an optical transceiver.

Further, a correct position alignment of the optical socket 137 and the optical circuit board 130 is performed as shown in FIG. 6(*a*). For example, a position adjustment device 300 is used for the correct position alignment. The position adjustment device 300 includes an optical head 310 for reading an object and an alignment mark described below, a computer system 320 to detect the position difference between the alignment mark and the object by an image processing, an actuator 330 being driven so as to compensate for the difference by the computer system 320, and an arm (stage) mounted on the actuator to carry the glass substrate 131 or the optical head 310 to the mounting position. The optical head 310 inserts a ferrule (a reader) into a fitting hole 137*b* of an optical socket 137, and reads an alignment mark, which represents the central position of the fitting hole 137*b*, and an object, for example, a specific circuit pattern of the board or a mark for adjustment. Based on this result, a position alignment (a fine adjustment) is performed in order that the central axis of the fitting hole 137*b* in the optical socket 137 is correctly coincident with the central position (optical axis) of an optical element 133 and a coupling lens 135 (or a coupling lens 136 and an optical element 134). When the optical plug 200 is loaded into the optical socket 137, the core of the optical fiber 203 supported inside the ferrule 202 is positioned on the central axis of the fitting hole 137*b*. This position adjustment device 300 is described again below.

As shown in FIG. 6(*b*), after finishing the position alignment of the optical socket 137 and the optical circuit board 130, an adhesive 138 is hardened to fix the optical socket 137 to the optical circuit board 130. As the adhesive 138, for example, it is possible to use a resin such as a photo-curable resin and a thermosetting resin.

Figure 8:
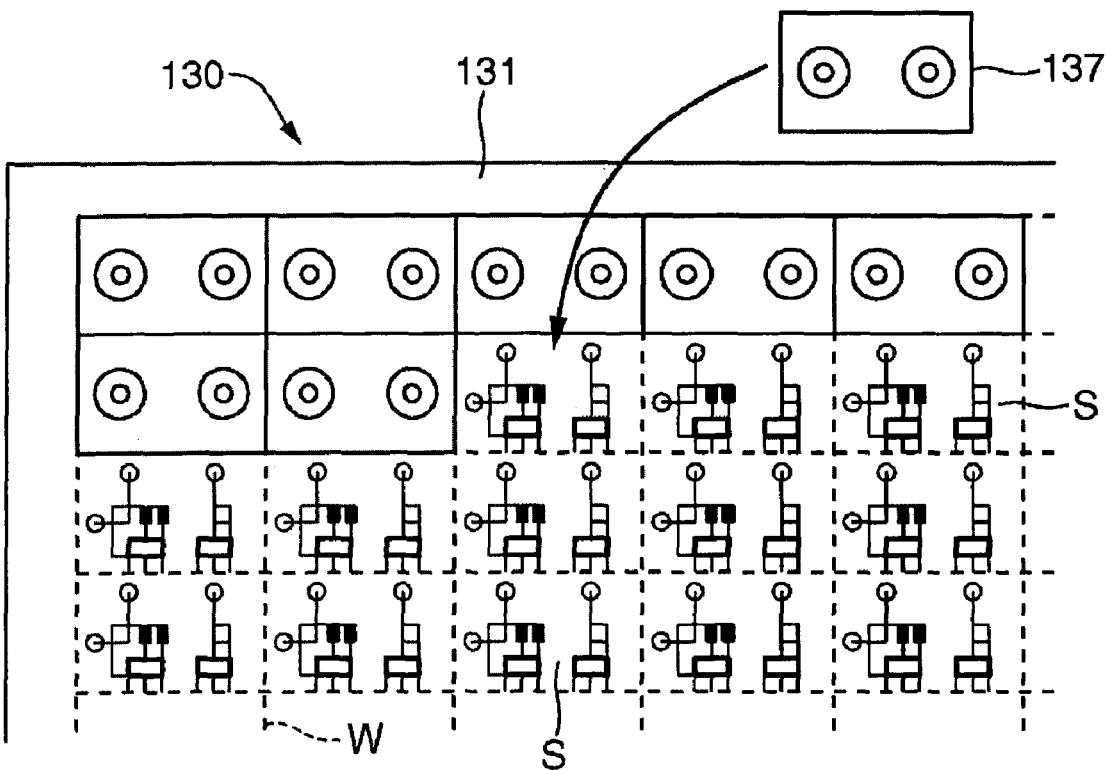
FIG. 8 is a schematic illustrating an example of mounting an optical socket on a substrate.

The processes of FIG. 5(*e*), FIG. 6(*a*), and FIG. 6(*b*) are repeated a required number of times, so that, as shown in FIG. 8, optical sockets 137 are attached to a plurality of sub-regions S of the optical circuit board 130 to assemble an optical transceiver. The board 130 assembled in such manner is cut for each sub-region S along cutting lines W, thereby obtaining a large number of optical transceivers.

Figure 9:
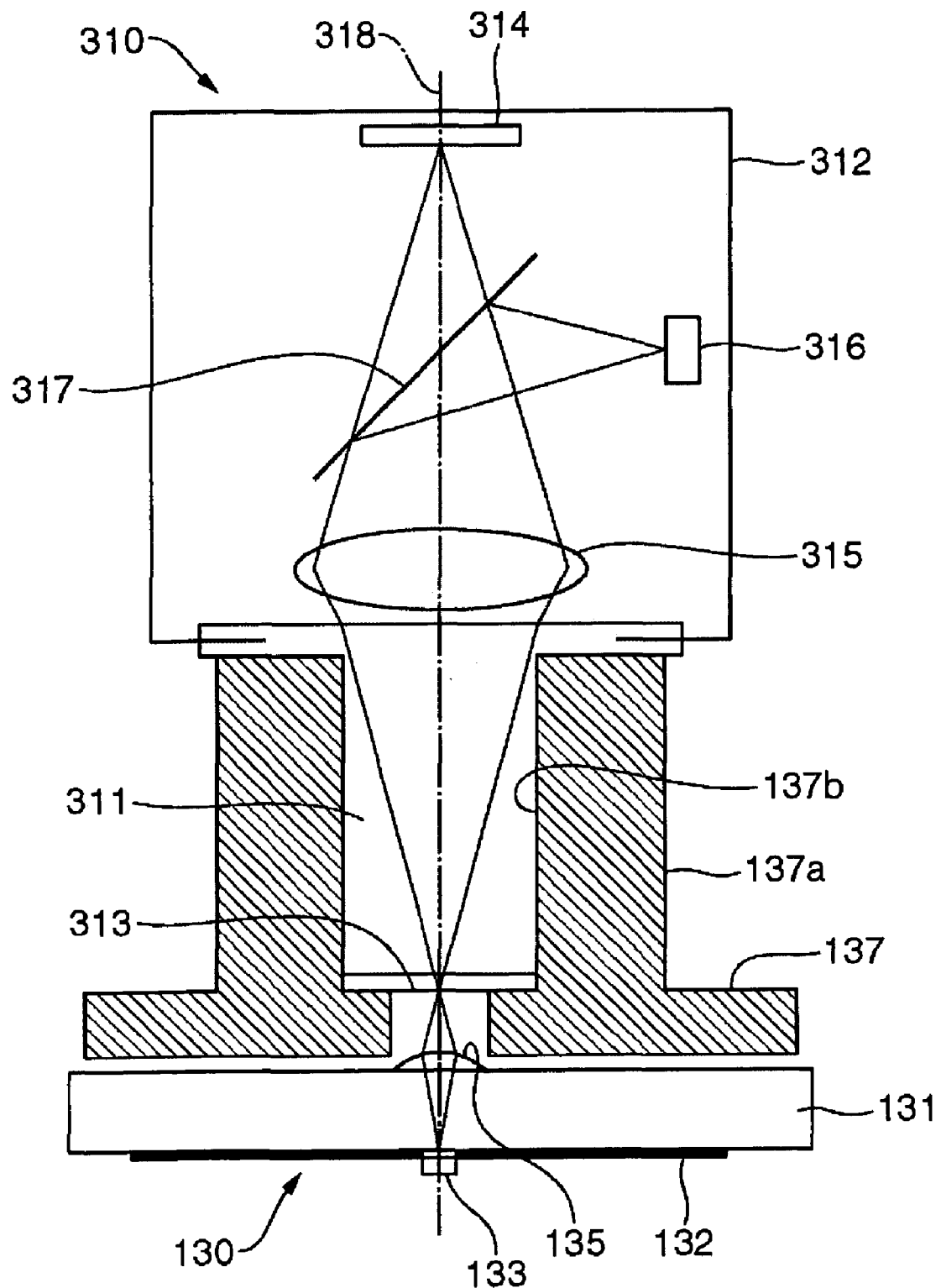
FIG. 9 is a schematic illustrating an example of an optical head.

FIG. 9 is a schematic illustrating an example of an adjustment device (an optical head) designed to perform a mounting position adjustment of the optical socket 137. In this figure, portions corresponding to those of FIG. 2 are denoted by the same reference numeral, and the explanation of such portions is omitted.

An optical head 310 includes a ferrule 311 as a columnar member to transmit light, which is inserted into a fitting hole 137*b* (a guide groove) of a sleeve 137*a* of the optical socket 137, and a housing portion 312 disposed on the upper end of this ferrule 311. A ferrule alignment mark 313 is formed on the lower end of the ferrule 311. The housing portion 312 includes therein a CCD image pick-up element 314 to read a mark, a lens 315 to form a read image of an alignment mark on the board (refer to FIG. 10), or the ferrule alignment mark 313 on the CCD image pick-up element 314, an illuminating light source 316, such as an LED and a mercury lamp, which illuminates the surface of the lower end of the ferrule 311 as needed, and a half mirror 317 to guide light of the illuminating light source 316 toward the ferrule 311.

According to such constitution, the bottom part of the fitting hole 137*b* in the sleeve 137*a* is illuminated by the illuminating light source 316, and an image of the bottom part is read together with the ferrule alignment mark 313 by the CCD image pick-up element 314.

Figure 10:
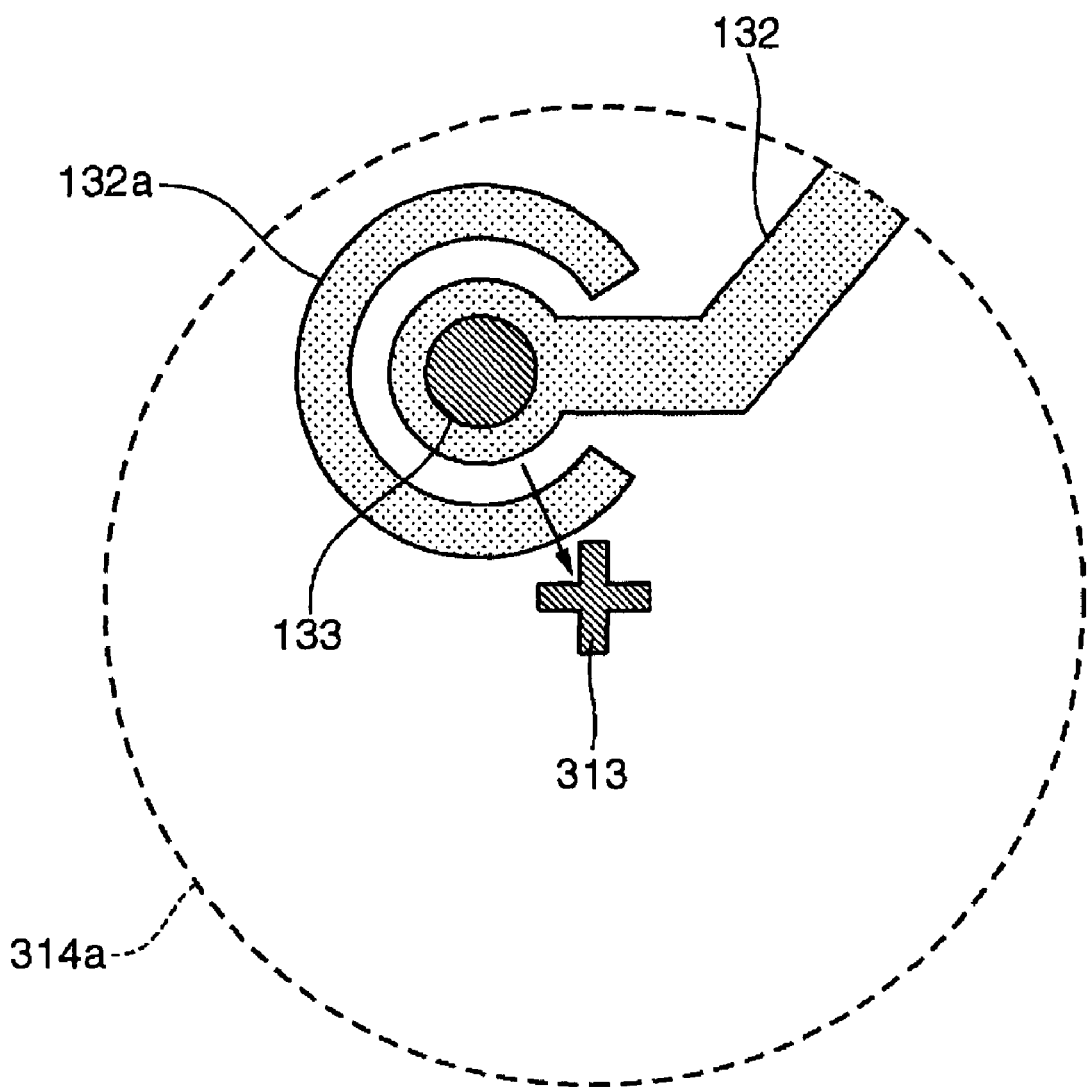
FIG. 10 is a schematic illustrating an example of an image read by an image pick-up element.

A mounting position adjustment of the optical socket 137 using such an optical head 310 is described as follows. First, the ferrule 311 of the optical head 310 is tightly inserted into the sleeve 137*a*. Thereby, a photographed image, as shown in FIG. 10, is obtained with the CCD image pick-up element 314. The ferrule alignment mark 313 is positioned in the central portion of the fitting hole 137*b* (the central position of the lower end surface of the cylindrical portion 311) or in the central part of a screen 314*a*. As mentioned above, the bottom of fitting hole 137*b* is illuminated by the illuminating light source 316, so as to irradiate the alignment mark 132*a* on the surface emitting laser 133 and the ferrule alignment mark 313. Besides a position alignment mark prepared particularly for the mounting adjustment of the optical socket 137, for example, the shape of a light-emitting portion in the light-emitting element 133 or a light-receiving portion in the light-receiving element 134, an alignment mark prepared to mount the light-emitting element 133 or the light-receiving element 134, an electrode or wiring pattern, mounted parts, etc., can also be used as an alignment mark for the alignment mark 132*a*. As object bodies, these become objects to be photographed by the CCD image pick-up element 314. The light irradiated on the alignment mark is reflected, is incident on the lens 315, and is focused to form an image of each alignment mark on the CCD image pick-up element 314. The CCD image pick-up element 314 arranges a large number of read pixels and converts the alignment mark image to an image signal. This signal is image-processed by the computer system 320 to discriminate the position of each alignment mark, and the position of the optical socket 137 is moved relative to the board 130 so that both alignment marks overlap (refer to FIG. 6(*a*)). In an example shown in FIG. 10, an optical circuit board 130 and an optical socket 137 are suitably moved relative to each other, so that the central position of a C-shaped alignment mark 132*a* on the board overlaps with an alignment mark 313 of the ferrule. Thereafter, the adhesive 138 is hardened. When the optical socket 137 includes a plurality of sleeves 137*a* to connect a plurality of optical fibers, the mounting position adjustment of the optical socket for a plurality of optical fiber terminals can be performed by carrying out the above-mentioned position alignment with fitting holes 137*b* in at least two sleeves 137*a*.

In such a manner, it is possible to arrange the optical elements 133 and 134, the coupling lenses 135 and 136, and the optical fiber 203 on one optical axis 318, thereby reducing the connection loss in an optical connector. Further, the above-mentioned adjustment method can be used in mounting the optical socket in the can package as the related art.

Another constitution example of the optical head 310 is described below with reference to the drawings.

Figure 11:
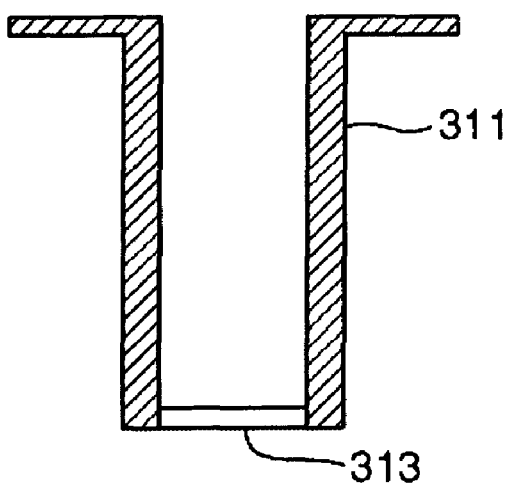
FIG. 11 is a schematic illustrating another constitution example (a columnar body) of the ferrule of the optical head.

FIG. 11 shows another constitution example of the ferrule 311 in the optical head 310. The ferrule 311 may be composed of a hollow cylindrical member as shown in FIG. 1, as well as the above-mentioned columnar member as shown in FIG. 9.

Figure 12:
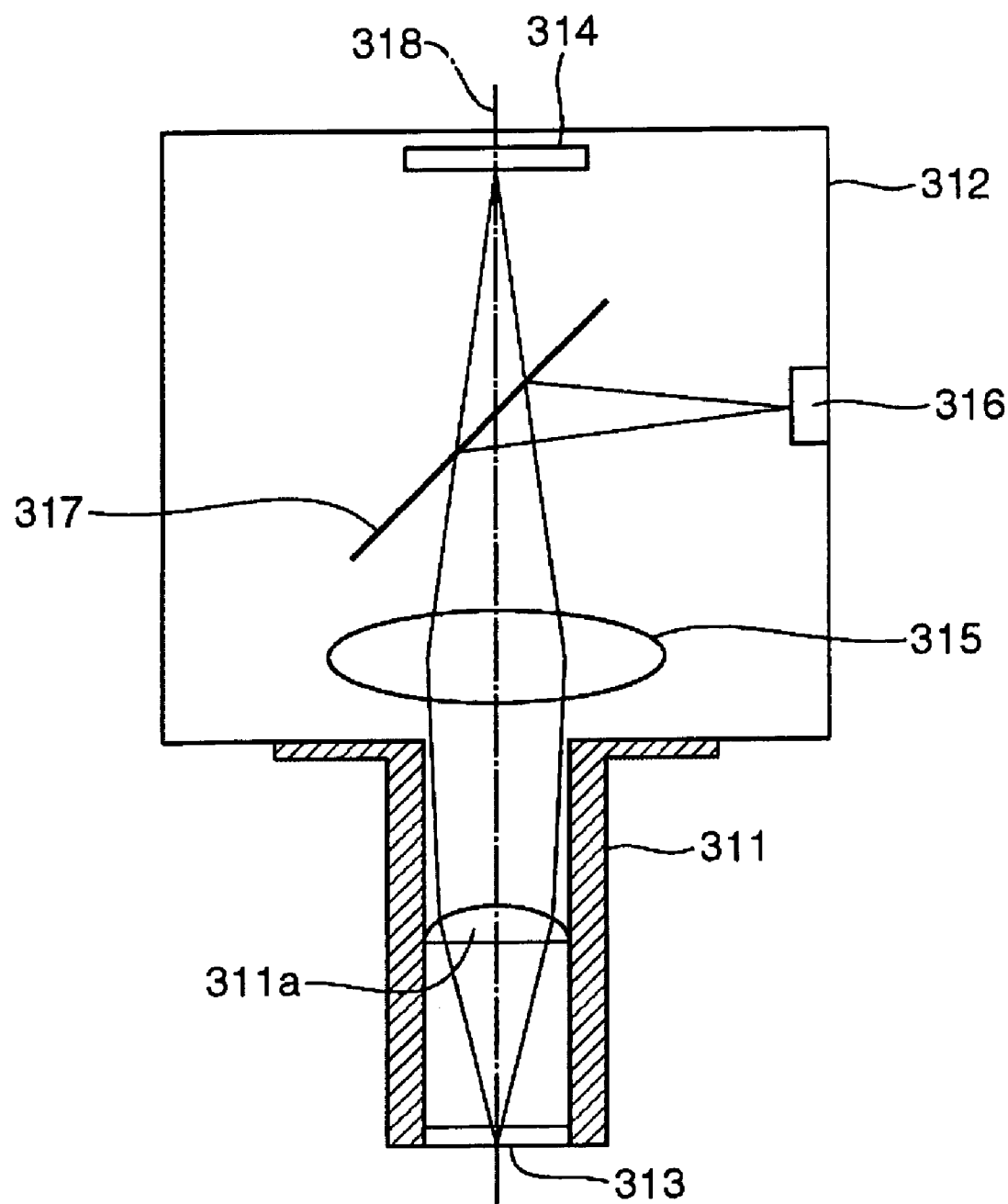
FIG. 12 is a schematic illustrating still another constitution example (of a lens built-in type) of the ferrule of the optical head.

FIG. 12 shows another constitution example of the ferrule 311 of the optical head 310. In this figure, portions corresponding to those of FIG. 9 are denoted by the same reference numeral, and the explanation of such portions is omitted.

In this example, a small-sized lens 311*a* is additionally disposed in the ferrule 311 composed of the hollow cylindrical member. This lens 311*a* allows light reflected from the board 130 or the alignment mark 313 to be light beam parallel to the optical axis 318 of the lens 315, thereby increasing the amount of light and the light beam to be incident on the CCD image pick-up element 318. Thus, the numerical aperture NA of an optical system equivalently increases, thereby achieving an enhancement in the image quality of photographed images.

Figure 13:
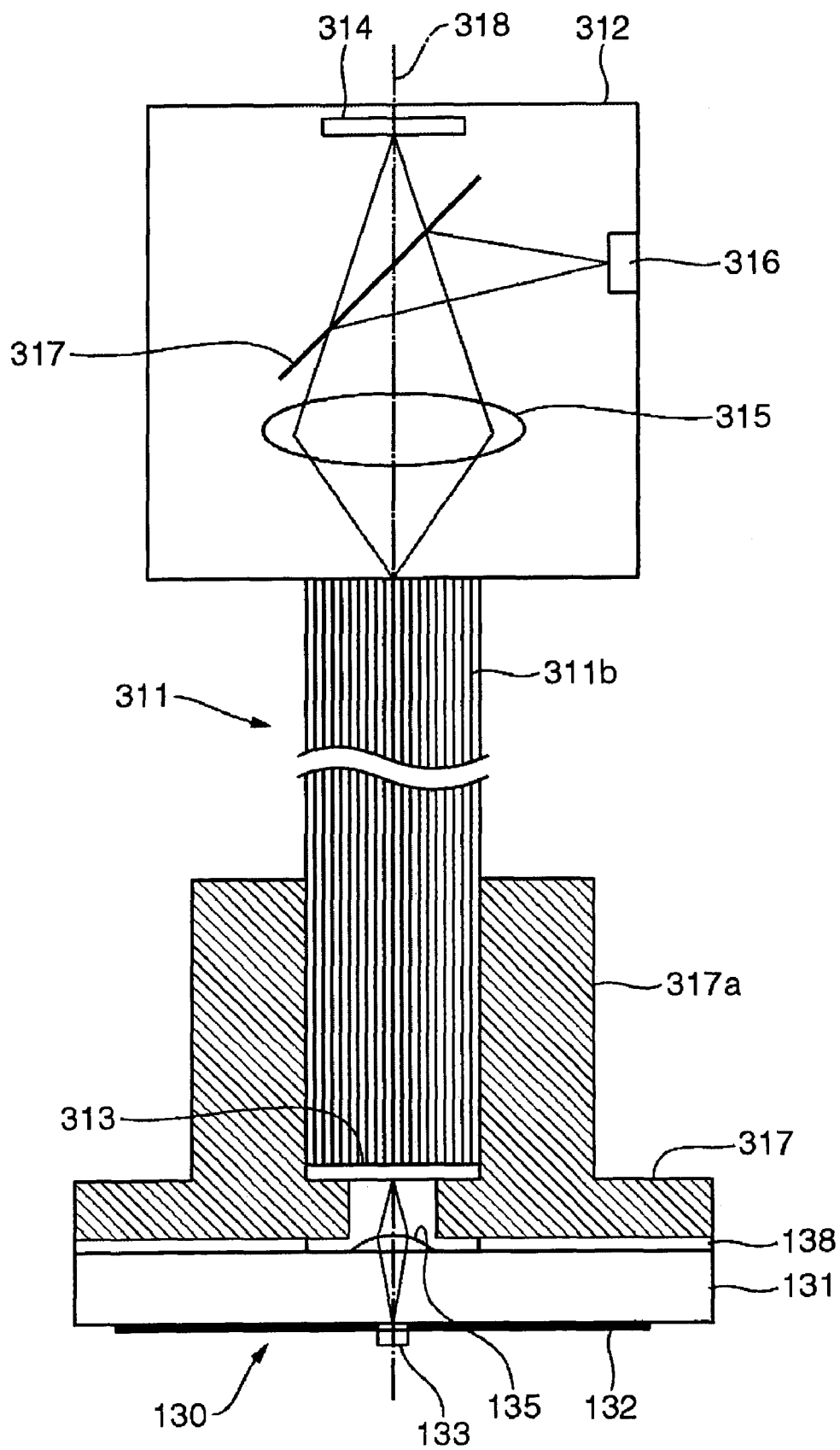
FIG. 13 is a schematic illustrating yet another constitution example (using an optical fiber) of the ferrule of the optical head.

FIG. 13 shows another constitution example of the ferrule 311 of the optical head 310. In this figure, portions corresponding to those of FIG. 9 are denoted by the same reference numeral, and the explanation of such portions is omitted.

In this example, the ferrule 311 is composed of a bundle of a large number of optical fibers 311*b*. According to this constitution, by using flexible optical fibers, it is possible to separate the position of the housing 312 from the position of the optical circuit board 130, and to place it in a desired position or orientation.

FIGS. 14(*a*) and 14(*b*) are schematics illustrating another example of forming the lenses 135 and 136 of the optical circuit board. In this example, the lenses are formed using a mold.

First, as shown in FIG. 14(*a*), the optical socket 137 coated with a photo-curable resin or a thermosetting resin for example, a photo-curable adhesive 138 which is cured by ultraviolet irradiation is subjected to a position alignment (roughly adjustment) on the optical circuit board 130, so as to be tentatively attached thereto. A column-shape mold 401 is inserted into the sleeve 137*a* of the optical socket 137 along the fitting hole 137*b*. A shape corresponding to the coupling lens 135 (or 136) is formed in the front end of the mold 401. When the mold 401 is pushed into the fitting hole 137*b*, the resin 138 in the fitting hole 137*b* is collected to a part of the mold. Further, it is also possible to coat the photo-curable adhesive 138 on the part of the mold and insert it into the fitting hole 137*b* of the sleeve 137*a*. The shape of a space defined by the front end of the mold 401, the wall of the sleeve 137*a*, and the glass substrate surface of the optical circuit board 130 becomes the shape of a refractive lens or a Fresnel lens. The central axis of the column-shape mole 401 is coincident with the central axis (optical axis) of the lens.

In this state, as needed, the mold 401 and the optical socket 137 are moved relative to the glass substrate 131, so that the center of the lens is correctly aligned on the alignment mark (for example, electrode, wiring patterns, or the like) of the optical elements on the board (a fine adjustment). For example, the pattern of the mold 401 compares with the alignment mark of the board 130 by observing the mold 401, from the optical elements of the optical circuit board 130 to a camera through the glass substrate 131. Thus, the position adjustment of the mold and the alignment mark of the board can be performed.

Next, as shown in FIG. 14(*b*), an ultraviolet ray is irradiated to harden the adhesive 138, so that the optical socket 137 is fastened to the board 130 and the shape of the lens 135 is fixed. Thereafter, the mold 401 is drawn out.

In this example, the lens formation and the optical socket attachment are performed in the same process using the mold 401, and it is thus possible to simultaneously perform the respective processes of the lens attachment, the optical socket attachment, and the alignment adjustment in FIG. 5(*d*) to FIG. 6(*a*) as described above.

Figure 15:
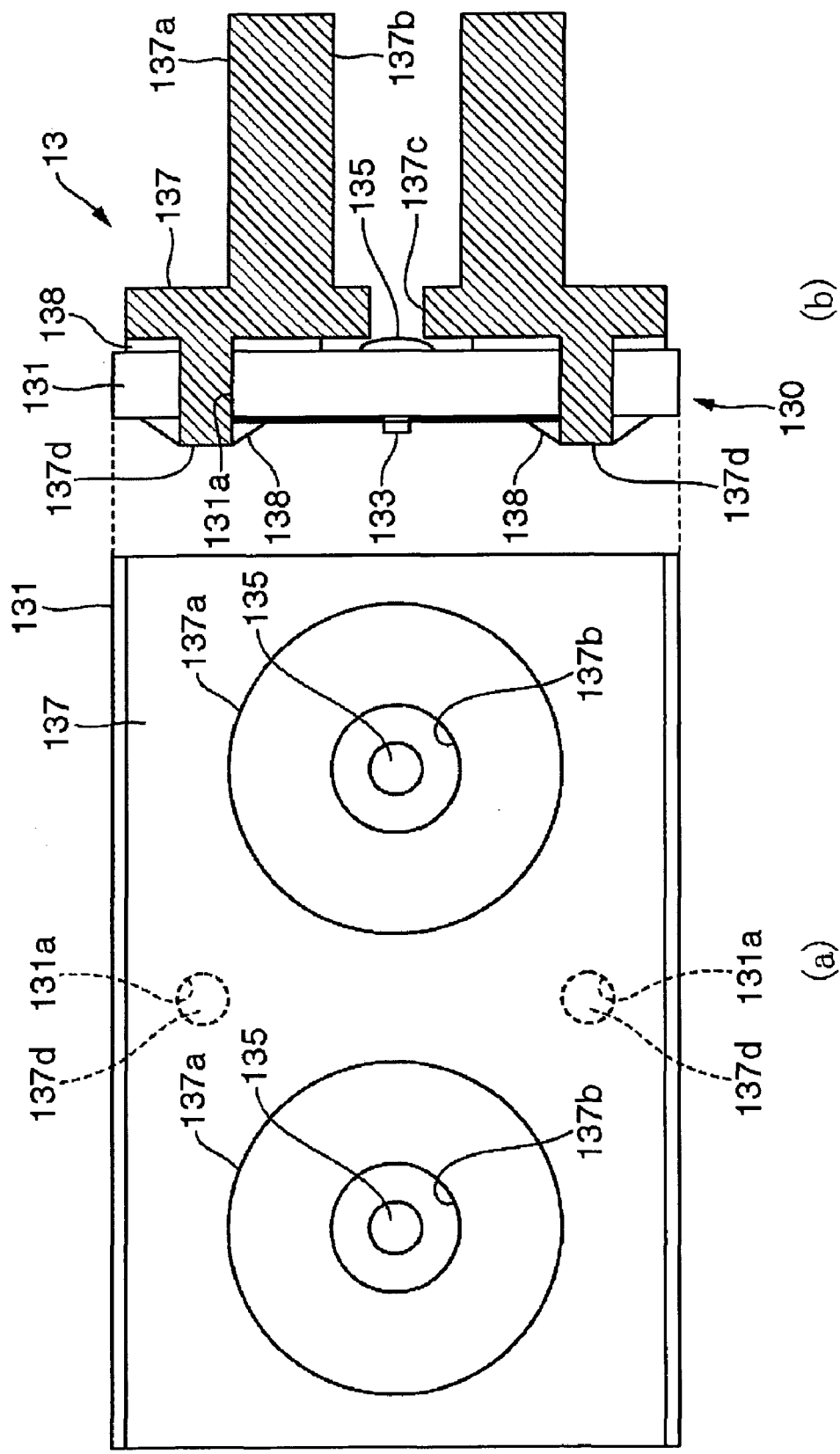
FIGS. 15(a) and 15(b) are schematics illustrating an example of forming a mounting projection and a mounting hole in a substrate and an optical socket, respectively.

FIGS. 15(*a*) and 15(*b*) show another exemplary embodiment. FIG. 15(*a*) is a schematic illustrating an optical coupling unit portion 13 of this exemplary embodiment as viewed from the insertion hole of an optical plug. FIG. 15(*b*) is a cross-sectional view of the optical coupling unit 13. In both figures, portions corresponding to those of FIGS. 2(*a*) and 2(*b*) are denoted by the same reference numerals, and the explanation of such portions is omitted.

In this exemplary embodiment, the attachment strength between the optical socket 137 and the optical circuit board 130 is increased. In addition, it is easy to perform the assembling process, while securing the accuracy of attachment of the optical socket 137 to the optical circuit board 130.

To this end, in this exemplary embodiment, projections 137*d* (guide pins) are formed in at least two places on the optical socket 137, as shown in FIG. 15(*a*) and FIG. 15(*b*).

These guide pins 137*d* are inserted into guide holes 131*a* that are formed in the glass substrate 130 in correspondence with these guide pins 137*d*.

Figure 16:
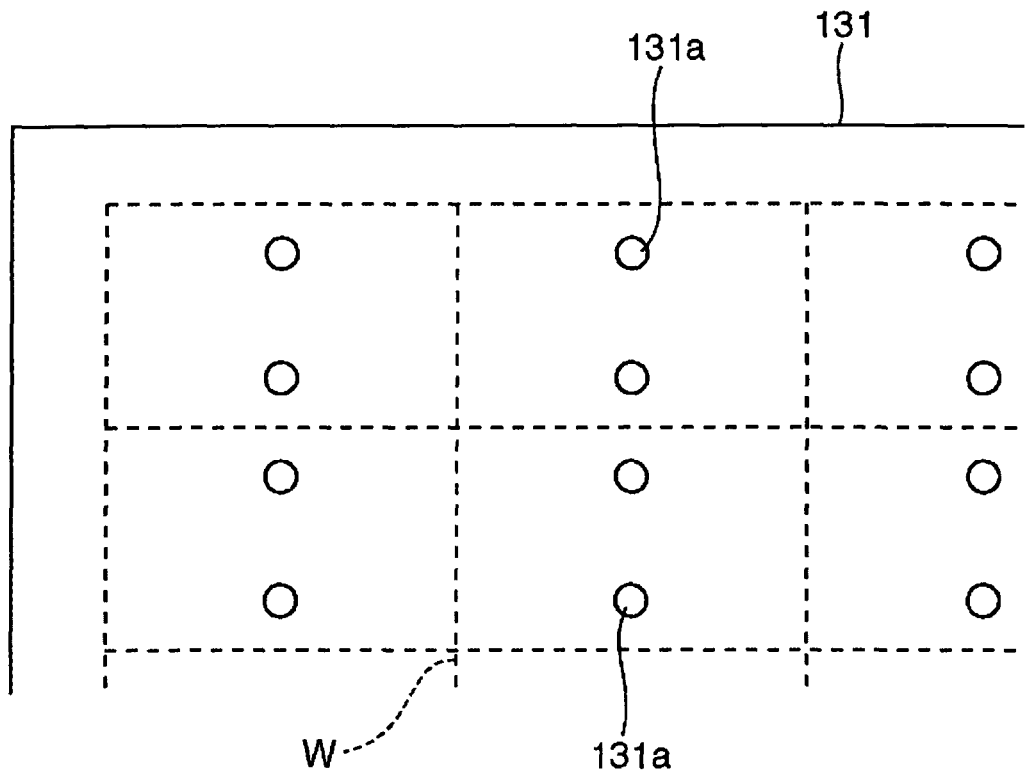
FIG. 16 is a schematic illustrating an example of forming a mounting hole in a substrate.

In an assembling process of this exemplary embodiment, guide holes 131*a* with a predetermined diameter are formed in advance with high accuracy in predetermined positions in the glass substrate 131 by photolithography or the like, as shown in FIG. 16. An optical element and a coupling lens can be mounted in predetermined positions with reference to these guide holes 131*a*. A wiring pattern 132 is formed on this glass substrate 131, the parts are mounted (refer to FIG. 9), and the optical socket 137 is attached (refer to FIG. 10).

In the optical socket 137, the guide pins 137*d* with a predetermined depth are accurately formed in a predetermined position with reference to the center of the guide holes 131*a*. The guide holes 131*a* of the substrate 131 and the guide pins 137*d* of the optical socket 137 are joined together to attach the socket 137 on the substrate 131. In addition, the guide pins 137*d* and the substrate 131 are bonded with the adhesive 138 so as to strongly fix them to each other.

In addition, it is also possible to form the optical transceiver using an optical socket having a built-in coupling lens.

Figure 17:
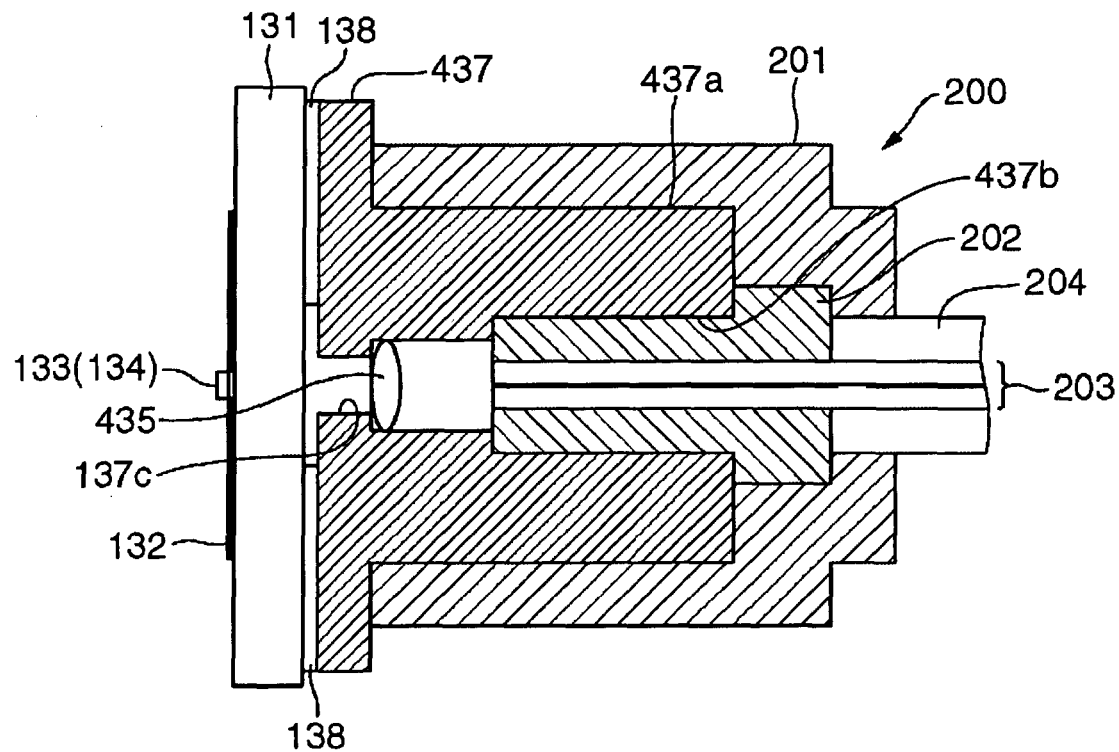
FIG. 17 is a schematic illustrating an exemplary embodiment using a lens built-in type optical socket.
Figure 18:
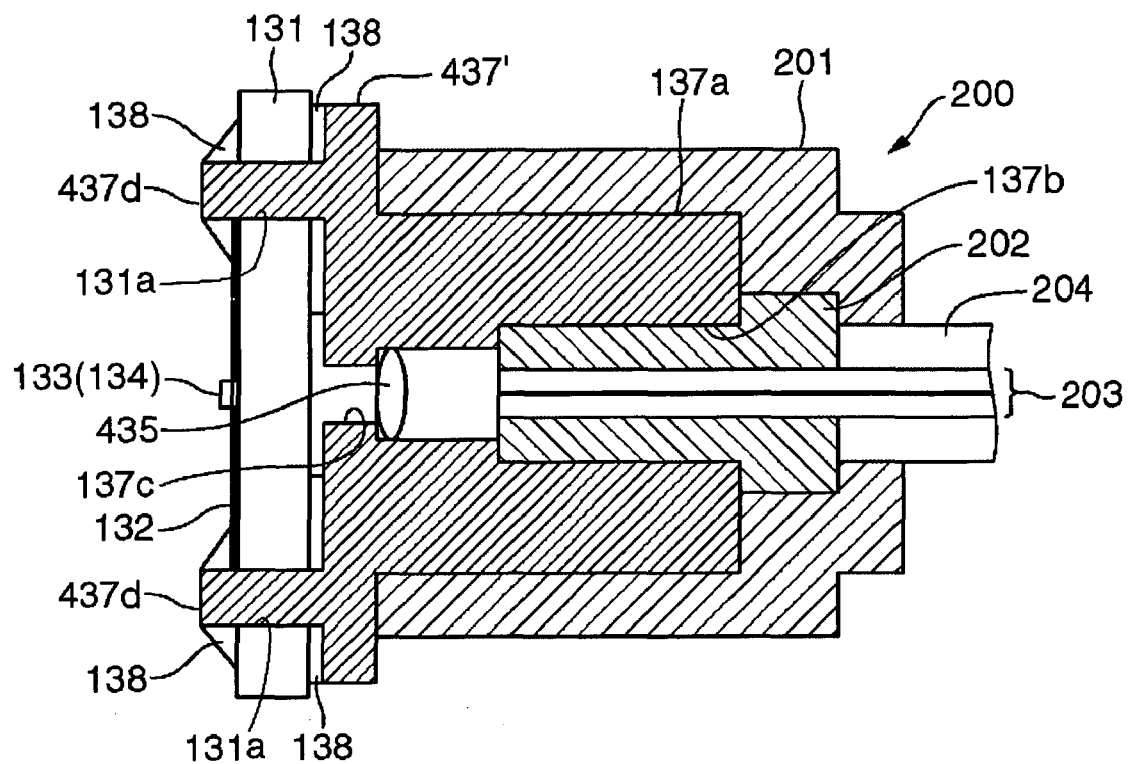
FIG. 18 is a schematic illustrating an exemplary embodiment using a lens built-in type optical socket.

FIG. 17 and FIG. 18 are schematics illustrating an exemplary embodiment that employs an optical socket with a built-in lens. FIG. 17 and FIG. 18 show the state in which the optical plug 200 is attached to an optical socket with a built-in lens 437. In both figures, portions corresponding to those of FIG. 3 are denoted by the same reference numerals, and the explanation of such portions is omitted.

The optical socket 437 shown in FIG. 17 has a coupling lens 435 built-in. In addition, in the exemplary embodiment shown in FIG. 17, the coupling lens 135 disposed on the inner surface of the transparent substrate 131 in the above-mentioned exemplary embodiment is omitted.

A columnar ferrule 202 of the optical plug 200 is inserted into a cylindrical sleeve 437a of the optical socket 437, and the ferrule 202 is protected with a plug housing 201. The optical socket 437 and the optical plug 200 are fastened with latching device (not shown). The latching device is, for example, a stud in which an openable and closable hook mounted on the plug housing 201 and the hook mounted on the optical socket 437 are engaged together. Light radiated from the core of an optical fiber 203 passes through the lens 435 built in the sleeve 437a and a transparent substrate 131, so as to converge (or focus) onto a light-receiving element 134. In addition, light emitted from the light-emitting element 133 passes through the transparent substrate 131 and the coupling lens 435, so as to converge to the core part of an end of the optical fiber 203.

The optical socket 437' shown in FIG. 18 has the same constitution as the above optical socket 437 shown in FIG. 17, but differs in that guide pins 437d are formed in at least two places. These guide pins 437d are inserted into guide holes 131a that are formed in the glass substrate 131 in correspondence with these guide pins 437d. Similarly to the exemplary embodiment described above referring to FIG. 15, according to this exemplary embodiment, it is possible to increase the attachment strength between the optical socket 437 and the optical circuit board 130, and further to make the assembling easy, while securing accuracy of the attachment of the optical socket 437 to the optical circuit board 130.

Although the process of manufacturing an optical transceiver employing the optical socket 437 shown in FIG. 17 or the optical socket 437' shown in FIG. 18 is the same as that of the exemplary embodiment described above referring to FIG. 5, it is possible to simplify the manufacturing process because there is no need to form a coupling lens 135 on the transparent substrate 131.

Figure 19:
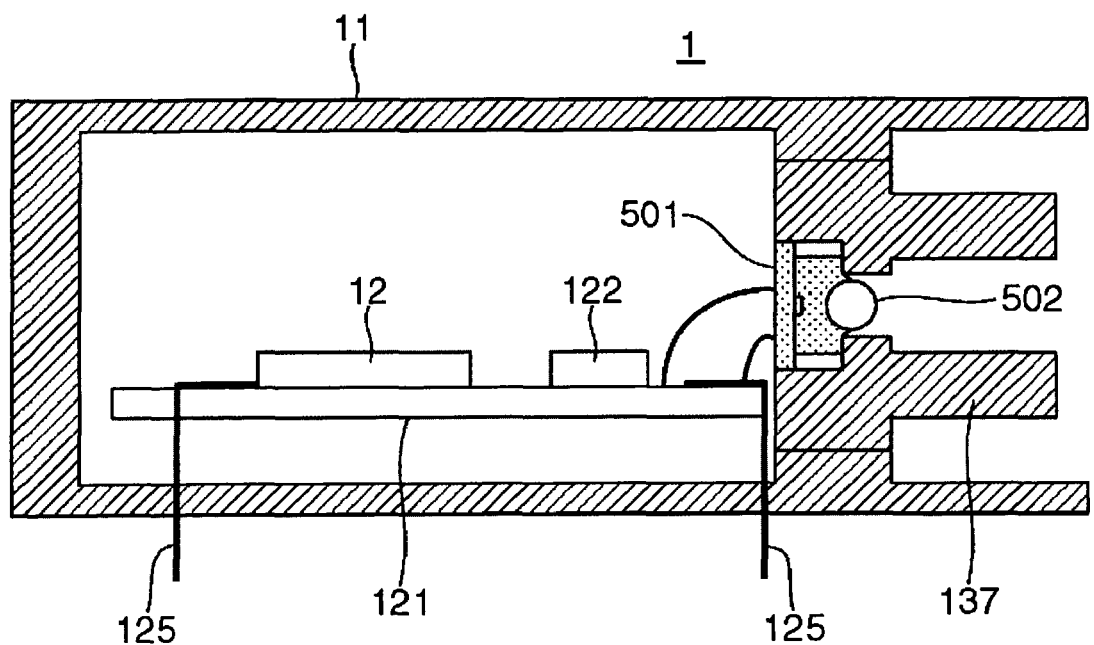
FIG. 19 is a schematic illustrating an example of an optical transceiver according to a comparative example.
Figure 20:
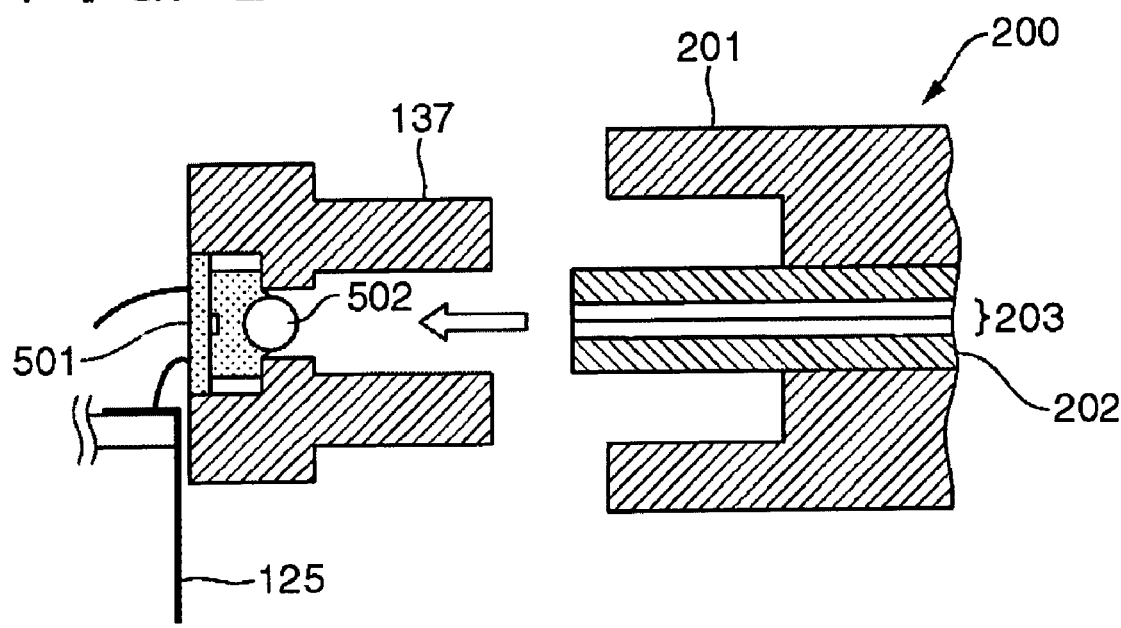
FIG. 20 is a schematic illustrating an example of an optical connector of according to a comparative example.

FIG. 19 and FIG. 20 show a comparative example of optical transceiver illustrating the advantage of the present invention. FIG. 19 is a cross-sectional view of a housing of the optical transceiver of the comparative example, in which portions corresponding to those of FIG. 1(b) are denoted by the same reference numerals, and the explanation of such portions is omitted.

Also in the comparative example, an electrical signal is provided to a circuit board 121 through a lead frame 125 from the outside. A parallel-serial conversion circuit 12 and a drive circuit 122 to drive a laser diode, etc., are mounted on the circuit board 121. The laser diode is mounted in a can package 501 of metal. A beam emitted from the laser diode is focused with a ball lens 502 attached to a window of the can package 501, so as to be collected to the central part of an insertion hole of a sleeve of an optical socket 137.

FIG. 20 shows an optical connector part in the comparative example. A ferrule 202 with an optical fiber 203 fixed to the center thereof is inserted into the central part of an optical plug 200. When the optical plug 200 is connected to a socket 137, light focused with the ball lens 502 is incident on the center of a core in the optical fiber 203.

Processes, such as mounting the laser diode chip into the can package 501, bonding the chip and a lead line, attaching the ball lens to the can package window, and assembling a lens-attached can package are required in the constitution of such comparative example. In addition, this can package is inserted into a hole on one side of the sleeve of the socket, the ferrule supporting a fiber is inserted from the other side, the laser diode is activated to emit light, and the can package and the sleeve are attached and fixed in a position where light is transmitted most effectively. Thereafter, the lead line of the can package is soldered to the circuit board, finishing the procedure.

The optical transceiver of the comparative example having such a constitution has a three-dimensional structure, and therefore a complicated position alignment must be performed when assembling constituent parts. On the contrary, according to the exemplary embodiment of the present invention, it is advantageous in that, because a light-transmitting substrate is used to form the optical transceiver, it is possible to perform the assembling through a substantially two-dimensional position alignment.

As explained above, according to the exemplary embodiment of the present invention, an optical coupling unit of an optical transceiver is obtained with a constitution in which a wiring and an optical element are disposed on one surface of a transparent substrate and a coupling lens and a sleeve are disposed on the other surface of the substrate. According to such a constitution, it is possible to manufacture the optical transceiver by forming a large number of sets of wiring patterns or coupling lenses on one board and cutting this into sub-boards. Thus, it is suitable for a mass production process.

In addition, it is desirable to overlap the ferrule alignment mark of the position adjustment device on the alignment mark of the board, and manually or automatically move in a two dimensional manner the positions of the sleeve and the lens before they are fixed. Thus, the sleeve and the lens are aligned, and it is also suitable for automation easily.

Further, elements or sleeves can be mounted rapidly and continuously while sliding the glass substrate.

Furthermore, it is possible to perform an inspection of each of temporary-combined units, an adjustment of the output of a surface emitting laser (VCSEL), and an adjustment of the sensitivity of a light emitting diode (PD), while sliding the glass substrate.

Moreover, according to an adjustment method using an optical head in this exemplary embodiment, an image picking-up is performed by a CCD image pick-up element, whereby the relative position relationship between a ferrule alignment mark and an alignment mark on a light-emitting element or a light-receiving element can be accurately detected by image processing. Therefore, the number of loops of the position detection and movement is reduced to achieve positioning rapidly.

Accordingly, a significant reduction in cost can be achieved in comparison with the method according to the related art that performs mounting or assembling parts individually.

<Second Exemplary Embodiment>

Figure 21:
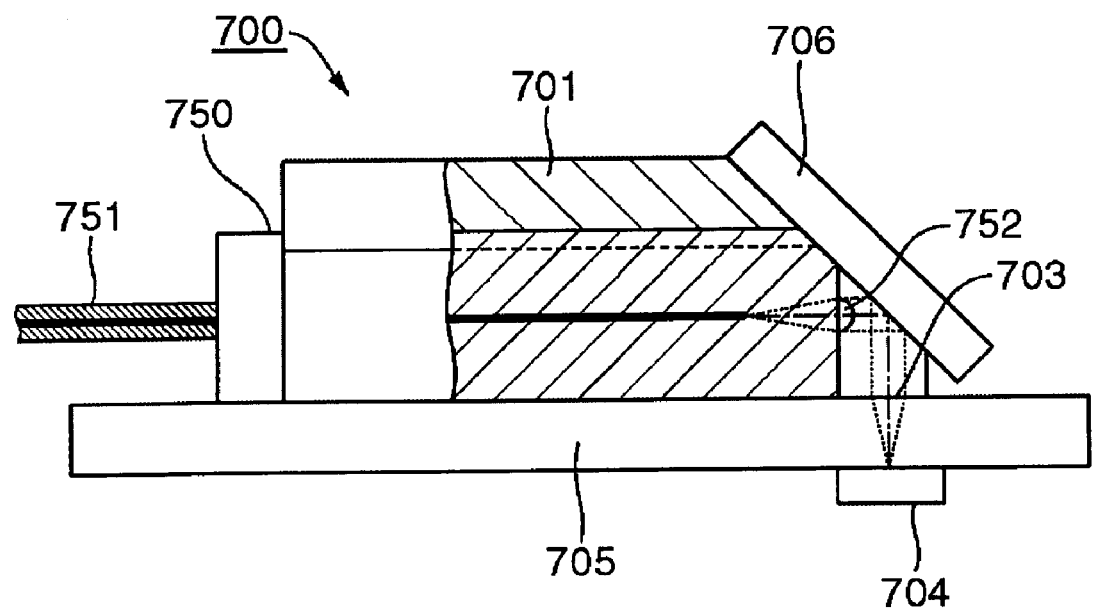
FIG. 21 is a schematic illustrating the constitution of an optical transceiver according to a second exemplary embodiment.
Figure 22:
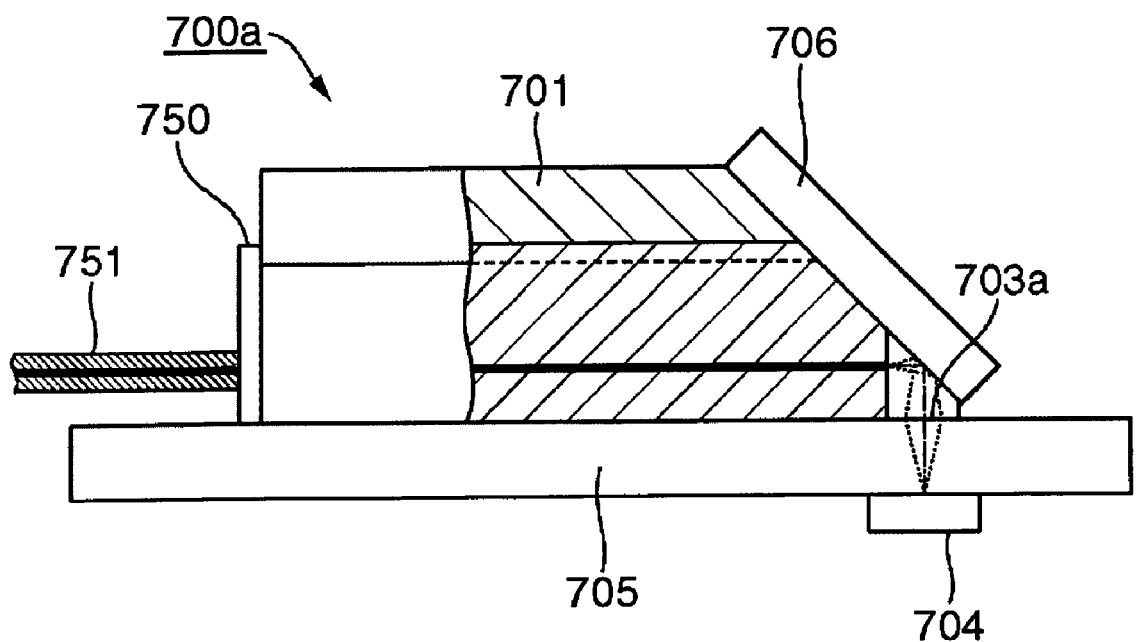
FIG. 22 is a schematic illustrating another constitution of the optical transceiver according to the second exemplary embodiment.

FIG. 21 and FIG. 22 are schematics illustrating the constitution of an optical transceiver according to a second exemplary embodiment. In FIG. 21 and FIG. 22, the optical transceiver of the present exemplary embodiment is shown partially in section. The optical transceiver 700 shown in FIG. 21 includes an optical socket 701 to mount an optical plug 750 disposed on an end of an optical fiber 751, a coupling lens 703 as a focusing device to focus light, an optical element 704 composed of a light-emitting element, such as a VCSEL to emit light according to an electrical signal supplied thereto, or a light-receiving element to generate an electrical signal according to a received light signal supplied thereto, and a light-transmitting substrate 705 to support each of the optical socket 701, a coupling lens 703, and the optical element 704 so that the optical fiber 751, the coupling lens 703, and the optical element 704 are aligned on one axis.

In addition, in this example, the optical socket 701 is disposed on the substrate 705 so that the extension direction of the optical fiber 751 is substantially parallel to the substrate 705, and a reflection plate 706 to change the traveling path of light exiting the optical fiber 751 or light outputted from the optical element 704 by about 90 degrees, is disposed on an end of the optical socket 701. A fitting hole (guide groove) whose cross-section is rectangular is formed in the optical socket 701, and the optical plug 750 is inserted into this fitting hole. In addition, in this example, a coupling lens 752 to focus light emitted from the optical fiber 751 or light emitted from the optical element 704 is disposed on an end of the optical plug 750.

Further, an optical transceiver 700a shown in FIG. 22 basically has the same constitution as that of the optical transceiver 700 shown in FIG. 21, and is configured so that the coupling lens array 752 on an end of the optical plug 750 is omitted, and light emitted from the optical element is guided to an end surface of the optical fiber 751 via a coupling lens 703a and a reflection plate 706, or light emitted from the optical fiber 751 is focused and is guided to the optical element 704.

In this manner, "one optical axis" in the present invention includes the case where the direction is changed on the way as in the example shown in FIG. 21 or 22, as well as the case where the direction is straight. Also in such a case, it is possible to obtain the effect of the present invention described above.

Now, manufacturing the above optical transceiver is described below with reference to the drawings. Because the manufacturing method of the optical transceiver in this example is basically or substantially the same as that of the first exemplary embodiment described above (refer to FIGS. 5(a)–5(e)), an explanation on the duplicated portions is properly omitted.

FIGS. 23(a)–23(f) are schematics illustrating a manufacturing process of the optical transceiver according to the second exemplary embodiment. First, a glass substrate 705 as a light-transmitting substrate is prepared as shown in FIG. 23(a). Subsequently, a conductive material, such as aluminum or copper, is deposited on a surface of the glass substrate 705 by a sputtering or electroforming method, thereby forming a metal film (a conductive film). This metal film is patterned in correspondence with a desired circuit, so as to form a wiring film 707 on the surface of the glass substrate 705 as shown in FIG. 23(b). Further, similarly to the case of FIG. 7 described above, a plurality of wiring films (metal wiring film patterns) 707 may be formed in a plurality of sub-regions of the glass substrate 705, respectively.

Subsequently, as shown in FIG. 23(c), an optical element (a light-emitting element or a light-receiving element) 704 or other circuit elements (an integrated circuit, etc.) are mounted on a surface of the glass substrate 705. This mounting can be implemented using flip chip bonding, wire bonding, solder reflow method, etc.

Subsequently, as shown in FIG. 23(d), an ultraviolet-curable resin 720, is coated on the other surface of the glass substrate 705, the ultraviolet-curable resin is used for fixing an optical socket 701 later. Further, it is also possible to use a thermo-setting resin or the like instead of the ultraviolet-curable resin 720.

In addition, in this time, a part of the ultraviolet-curable resin 720 is molded with a stamper 721, thereby forming a coupling lens 703 in a position corresponding to the optical element 704.

Subsequently, as shown in FIG. 23(e), the optical socket 701 is attached to the glass substrate 705 using the ultraviolet-curable resin 720. In this time, the optical socket 701 is mounted by performing a correct position alignment using both the same position adjustment device 300 as the first exemplary embodiment, as described above, and an optical head configured to be suitable for the optical transceiver 700 of this example. A detailed description on a constitution example of the optical head and a position adjustment performed using the optical head is provided below.

Subsequently, the ultraviolet-curable resin 720 is hardened to fix the optical socket 701 to the glass substrate 705, and, as shown in FIG. 23(f), the glass substrate 705 on which the optical socket 701 is mounted is cut for each predetermined region. Thereby, a large number of optical transceivers are obtained.

Figure 24:
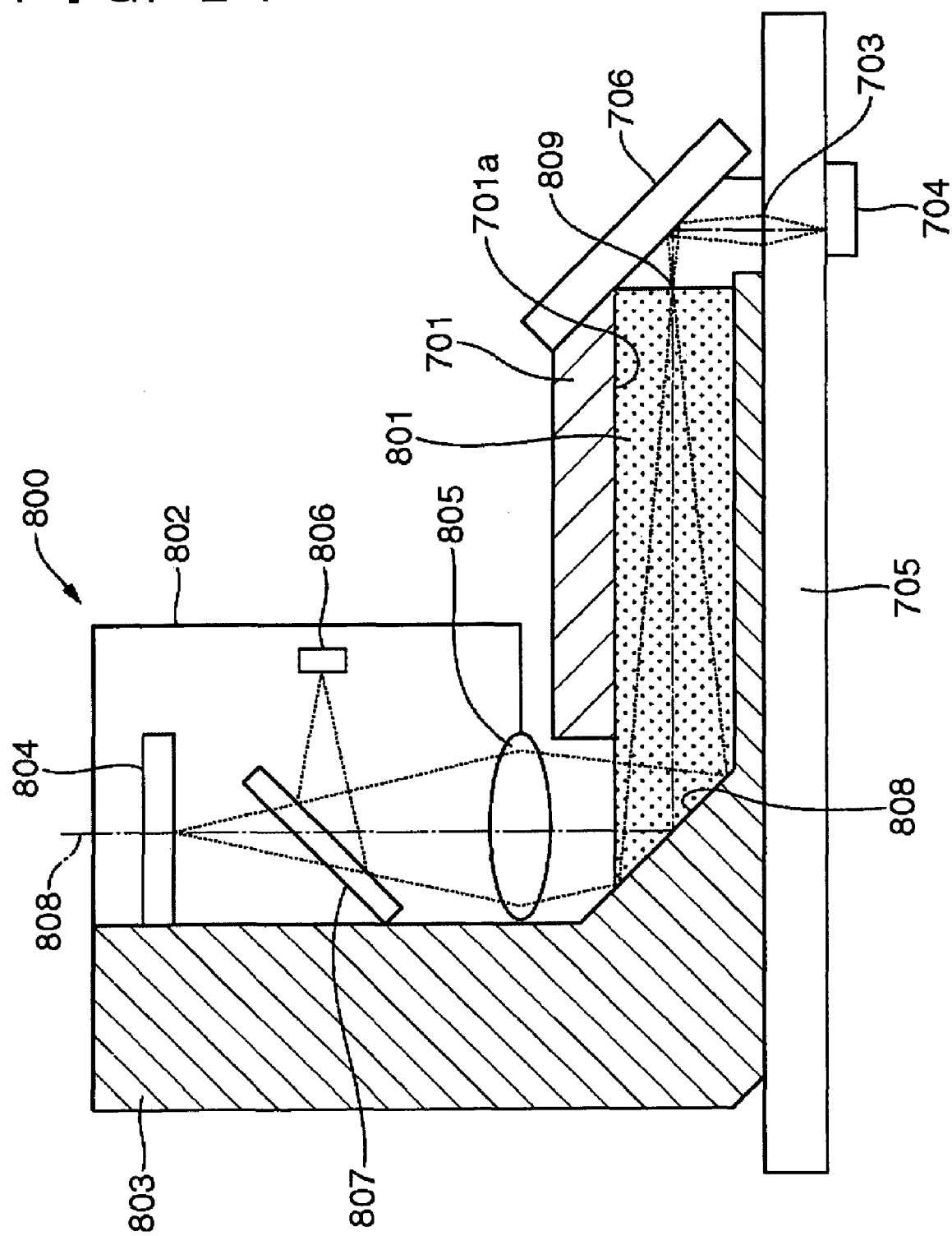
FIG. 24 is a schematic illustrating a constitution example of an optical head.

FIG. 24 is a schematic illustrating a constitution example of the optical head used in the process shown in FIG. 23(e) as described above. An optical head 800 shown in FIG. 24 comprises a probe (ferrule) 801, a housing portion 802, a supporting body 803, a CCD image pick-up element 804, a lens 805, an illuminating light source 806, and a half mirror 807.

The probe 801 is a columnar portion to be inserted into a fitting hole (guide groove) 701a of the optical socket 701 during the position adjustment, and is formed of a material such as a light-transmitting glass. A reflection portion 808 to reflect an incident light and changing its traveling path by about 90 degrees is disposed on one end of this probe 801, and an alignment mark 809 for use in the position adjustment is disposed on the other end (its side to be inserted into the optical socket 701).

The housing portion 802 supports optical elements, such as CCD image pick-up element 804 or a lens 805, and is disposed on an end portion of the probe 801 where light reflected by the reflection portion 808 is received.

The supporting body 803 is a substantially L-shaped member and, as shown in the figure, supports the probe 801 and the housing portion 802 so that the optical axis (longitudinal direction) of the probe 801 is substantially perpendicular to the optical axis of the optical element in the housing portion 802. A part of the supporting body 803 is inserted into the optical socket 701, together with the probe 801.

The CCD image pick-up element 804 converts light delivered through an optical system comprising the probe 801, etc., to an electrical signal (image signal), and is used in reading the above alignment mark 809, etc. The lens 805 allows a read image of an alignment mark (described below) disposed on the substrate or the alignment mark 809 to be formed on the CCD image pick-up element 804.

The illuminating light source 806 illuminates the other end of the probe 801 as needed, and uses an LED, a mercury lamp, or the like. The half mirror 807 guides light emitted from the illuminating light source 806 toward the probe 801. The light guided by the half mirror 807 is reflected by the reflection portion 808 on one end of the probe 801, and travels to the other end of the probe 801. According to such a constitution, the illuminating light source 806 illuminates around a region in which the optical element 704 of the glass substrate 705 is disposed, so that an image of the region is read by the CCD image pick-up element 804, together with the alignment mark 809.

Figure 25:
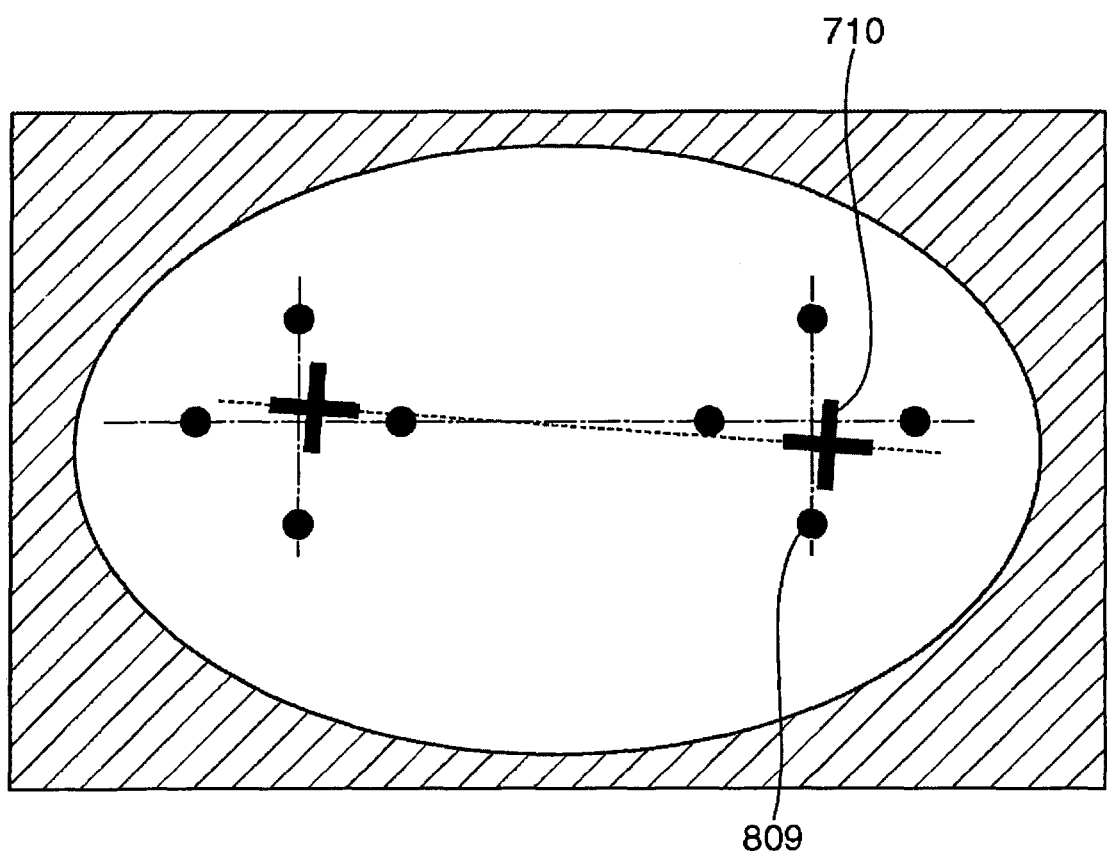
FIG. 25 is a schematic illustrating an example of a captured image.

A description is provided below regarding a mounting position adjustment of the optical socket 137 using the optical head 800 shown in FIG. 24. First, the probe 801 of the optical head 800 is tightly inserted into the fitting hole 701a. Thereby, a photographed image as shown in FIG. 25 is obtained using the CCD image pick-up element 804. In this example, the rear side of the fitting hole 701a (the center and right side in the figure) corresponds to the "bottom portion". In addition, an image of the alignment mark 710 on the substrate as an "object around the bottom portion" is obtained by photographing images around and in a position where the optical element 704 of the glass substrate 705 is mounted via the reflection plate 706.

Further, as mentioned above, the alignment mark 710 mounted on the substrate 705 and the alignment mark 809 on the end of the probe 801 are illuminated with the illuminating light source 806. In addition, the alignment mark 710 in this example is disposed on an element chip constituting the optical element 704, but other than a position alignment mark prepared particularly for the mounting adjustment of the optical socket 701, for example, the shape of the optical element 704, an alignment mark prepared to mount the optical element 704, an electrode or wiring pattern, mounted parts, etc., can also be used as the alignment mark. As object bodies, these become objects to be photographed by the CCD image pick-up element 804.

Light irradiated to the alignment mark is reflected therefrom, and the light is reflected from the reflection plate 706 of the optical transceiver 700. The reflected light passes through the probe 801, and is reflected from the reflection portion 808 on the end of the probe 801. The reflected light is incident on the lens 805, and is focused to form an image of each alignment mark in the CCD image pick-up element 804. The CCD image pick-up element 804 arranges a large number of read pixels and converts the alignment mark image to an image signal. This signal is image-processed by the computer system 320 (refer to FIGS. 6(a) and 6(b)) to discriminate the position of each alignment mark, and the position of the optical socket 701 is moved relative to the glass substrate 705 so that the position relationship of both alignment marks becomes a predetermined state. In an example shown in FIG. 25, the glass substrate 705 and the optical socket 701 are suitably moved relative to each other, and a position adjustment is performed so that a cross-shaped alignment mark 710 of the optical element 704 gets into a region surrounded by an alignment mark 809 of the probe 801 which is composed of four points. In such a manner, it is possible to align a coupling lens 703, an optical element 704, and an optical fiber 751 on one optical axis 808, thereby reducing the connection loss in an optical connector.

However, in an adjustment method of the present exemplary embodiment, it is important to securely form (join together focal points of) an image of the alignment mark 710 on the glass substrate 705 on the front end of the probe 801. To this end, a lens for adjusting an image formation position of the image of the alignment mark 710 is disposed between the probe 801 and the alignment mark 710 on the glass substrate 705, whereby it is possible to perform effectively the adjustment. A detailed description is provided below.

Figure 26:
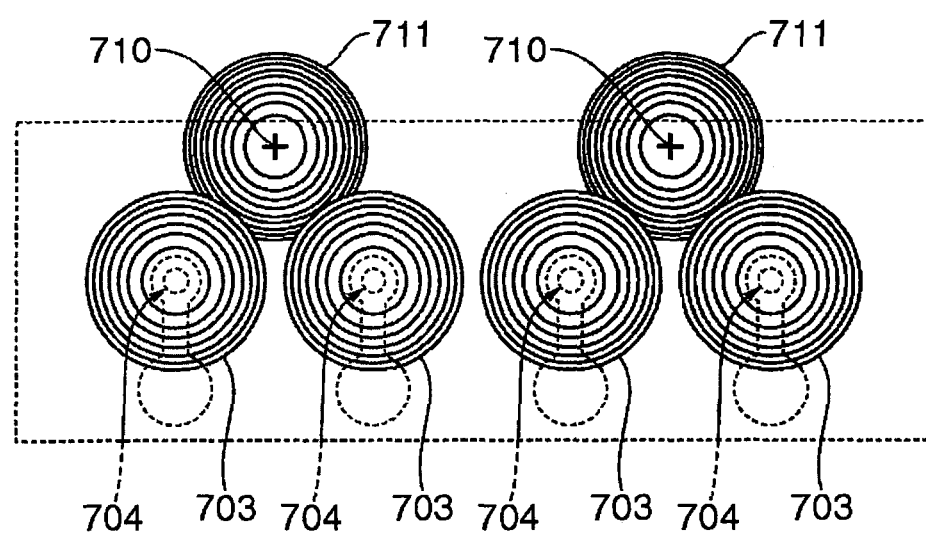
FIG. 26 is a schematic illustrating a constitution example of a lens for adjusting an image-formation position of an image of an alignment mark.

FIG. 26 and FIG. 27 are schematics illustrating a constitution example of a lens to adjust an image formation position of the image of the alignment mark 710. FIG. 26 and FIG. 27 are both plan views as viewed around the mounting position of the optical element 704 on the glass substrate 705 from the upper surface (the forming surface of the coupling lens 703).

In an example shown in FIG. 26, an element chip including four optical elements 704 (shown by dotted lines in the figure) disposed parallel to each other in a transverse direction is mounted on the rear surface of the glass substrate 705, and two alignment marks 710 are disposed on the upper side of the four optical elements 704. Further, four coupling lenses 703 are disposed on the front surface of the glass substrate 705 in correspondence with the optical elements 704, respectively, and in addition, two mark image-formation lenses (image-formation position adjustment lenses) 711 are disposed in correspondence with the two alignment marks 710. These mark image-formation lenses 711 are designed so that images of the alignment marks 710 are formed on the front end of the probe 801.

In addition, in an example shown in FIG. 27, four optical elements 704 are mounted on the rear surface of the glass substrate 705, and two alignment marks 710 are disposed on both sides of right and left sides of these four optical elements 704. Further, four coupling lenses 703 are disposed on the front surface of the glass substrate 705 in correspondence with the optical elements 704, respectively, and in addition, two mark image-formation lenses 711 are disposed in correspondence with the two alignment marks 710, respectively.

In this exemplary embodiment, each of the coupling lenses 703 and each of the mark image-formation lenses 711 are each composed of a diffractive lens. By using the diffractive lens, various kinds of lenses can be laid out easily and effectively in a random size and position. In addition, the coupling lens 703 may also be formed using a refractive lens or the like.

In such a manner, by using the image-formation adjustment lens, it is possible to photograph simultaneously (i.e., under the same photographing condition) both an image of the alignment mark 711 disposed on the glass substrate 705 and an image of the alignment mark 809 disposed on the front end of the probe 801, thereby achieving the position adjustment more effectively.

What is claimed is:

1. A method of manufacturing an optical transceiver, comprising:
    combining an optical socket and an assembling object to be assembled with the optical socket, the optical socket including a fitting hole to mount an optical plug holding an end portion of an optical fiber;
    mounting an optical head to photograph the assembling object in the fitting hole of the optical socket and to obtain an image of the assembling object exposed to the fitting hole and reference position information in a photographed image display screen;
    detecting a difference between the image of the assembling object and the reference position information;
    reducing the difference by moving the optical socket and the assembling object relative to each other based on the difference;
    fixing the assembling object and the optical socket; and
    including at least one of a wiring pattern, a positioning mark, a positioning hole, a light-emitting element, a light receiving element, a lens, and a window of the can package which are formed on the assembling object.

2. The method of manufacturing an optical transceiver according to claim 1, the assembling object including at least one of a light-transmitting substrate and a can package.

3. The method of manufacturing an optical transceiver according to claim 2, the mounting including disposing an image-formation position adjustment lens to adjust an image-formation position of the image between the optical head and the assembling object so as to obtain the image of the assembling object.

4. The method of manufacturing an optical transceiver according to claim 1, the reference position information being a marker representing a screen central position of the photographed image.

5. An alignment adjustment device for use with an object, comprising:
   an optical socket having a supporting body and defining a fitting hole;
   an optical head inserted into the fitting hole of the optical socket, the optical head photographing the object around a bottom portion of the fitting hole, and outputting an image of the object as a read signal together with information representing a photographing reference position;
   an image processing device to process the read signal to detect a difference between the object and the reference position;
   a moving device to reduce the difference by moving the supporting body and the optical socket relative to each other according to the difference; and
   the information representing the reference position being a marker indicating a screen central position of the photographed image.

6. The alignment adjustment device according to claim 5, the information representing the reference position being a marker indicating a predetermined position on a screen of the photographed image.

7. The alignment adjustment device according to claim 5, the information representing the reference position being an alignment mark formed on one end face of a columnar body in the optical head, the face facing the object inserted into the fitting hole of the optical socket.

8. The alignment adjustment device according to claim 5, the object including at least one of a wiring pattern, a positioning mark, a positioning hole, a light-emitting element, a light-receiving element, and a lens which are formed on the supporting body.

9. The alignment adjustment device according to claim 5, further comprising an image-formation position adjustment lens, disposed between the optical head and the object, to adjust an image-formation position of the image.

10. The alignment adjustment device according to claim 9, the image-formation position adjustment lens being disposed on a surface of the object.

* * * * *